United States Patent [19]
Bobbitt

[11] 3,842,346
[45] Oct. 15, 1974

[54] CONTINUITY TESTING OF SOLID STATE CIRCUITRY DURING TEMPERATURE CYCLING

[76] Inventor: Charles R. Bobbitt, 2536 E. Dahlia, Phoenix, Ariz. 85032

[22] Filed: Dec. 20, 1972

[21] Appl. No.: 316,796

[52] U.S. Cl. .............. 324/73 R, 324/158 F, 324/51
[51] Int. Cl. ........................................... G01r 15/12
[58] Field of Search .......... 324/72.5, 73 AT, 73 PC, 324/73 R, 158 F, 158 P, 158 T

[56] References Cited
UNITED STATES PATENTS

| | | | |
|---|---|---|---|
| 3,609,547 | 9/1971 | Slusser............................. | 324/158 F |
| 3,617,879 | 11/1971 | Magnier............................ | 324/57 R |
| 3,676,777 | 7/1972 | Charters........................... | 324/73 R |

OTHER PUBLICATIONS

"Plastic IC's Demand New Physical," Lawrence Curran, Electronics, Vol. 42, May 12, 1969, pp. 147-153.
Rene Goldberger, "Thermal Probe," Electronic Industries, Vol. 24, No. 5, May 1965, pp. 114-115.
"In-Depth Product-Planning Bears Fruit, " Electronics, Vol. 43, March 2, 1970, pp. 112-114.

*Primary Examiner*—Alfred E. Smith
*Assistant Examiner*—Rolf Hille
*Attorney, Agent, or Firm*—Walter W. Nielsen; Edward W. Hughes

[57] ABSTRACT

An inspection system for solid state circuitry formed on chips wherein circuits on a plurality of chips are scanned repeatedly in the presence of two different potentials, such as positive and negative probing pulses, during controlled temperature variations of the chips over a given range, for detecting continuity of the circuits on the chips under temperature conditions within the given range.

8 Claims, 17 Drawing Figures

THERMAL INTERMITTENT TESTER

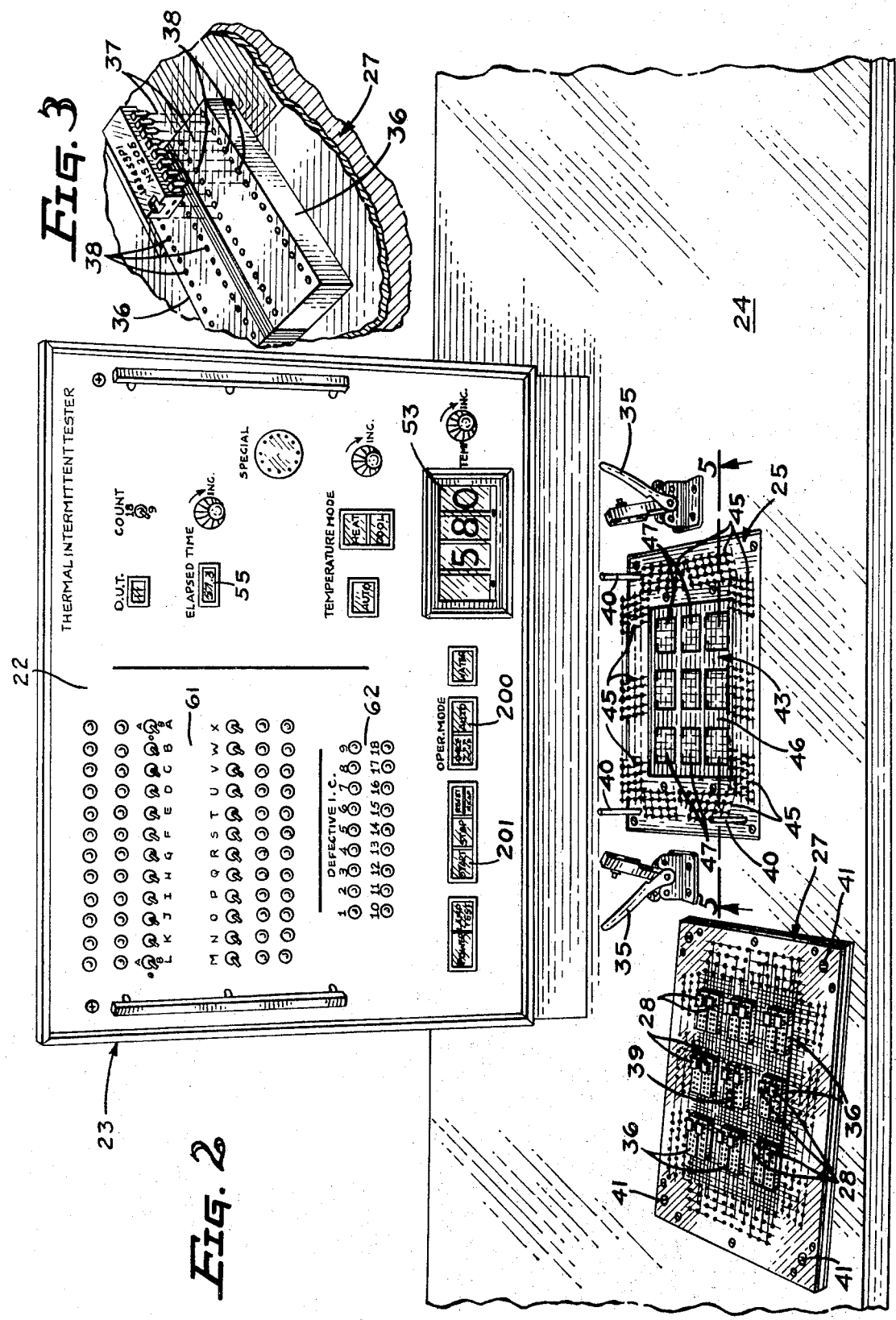

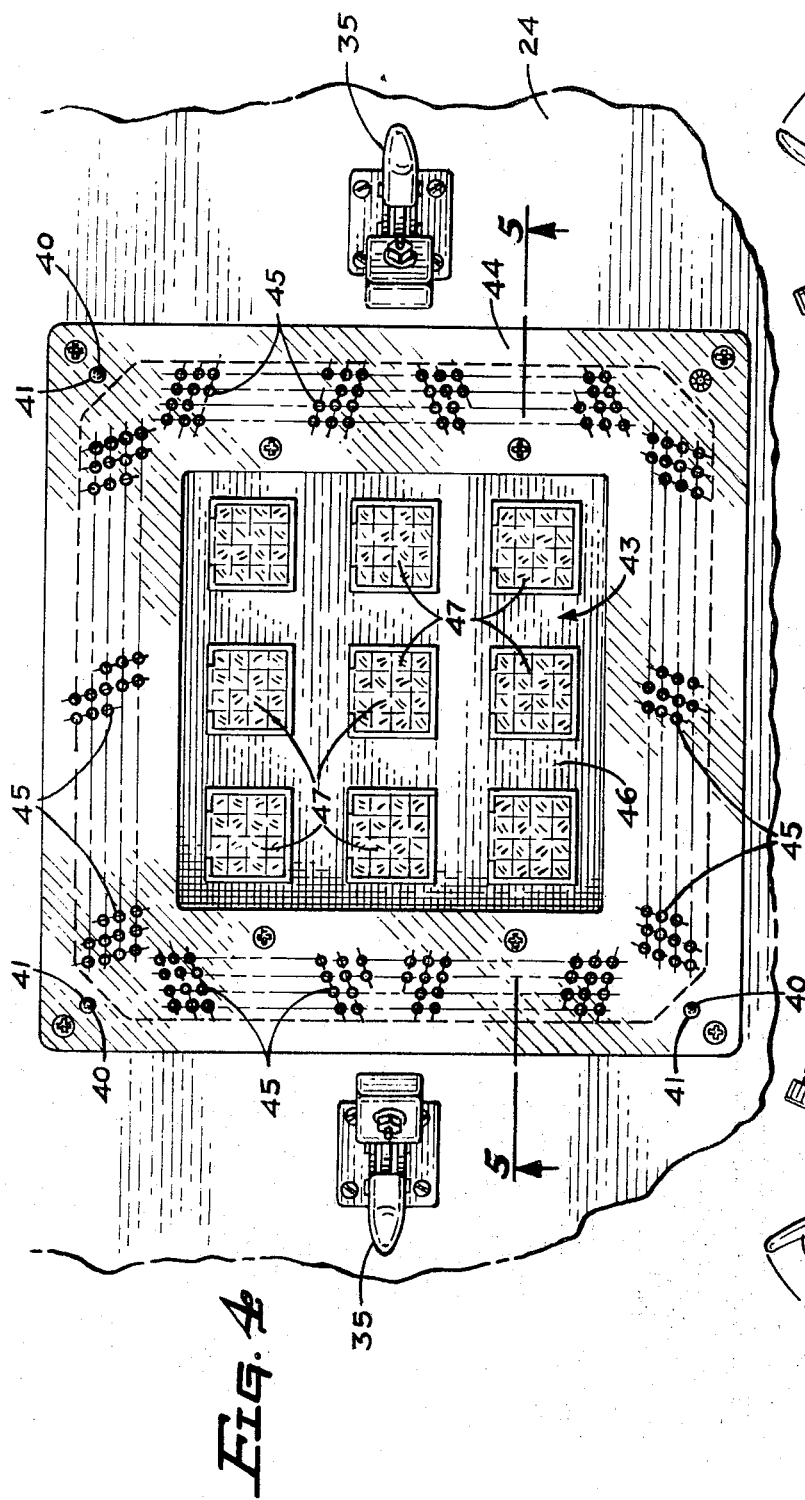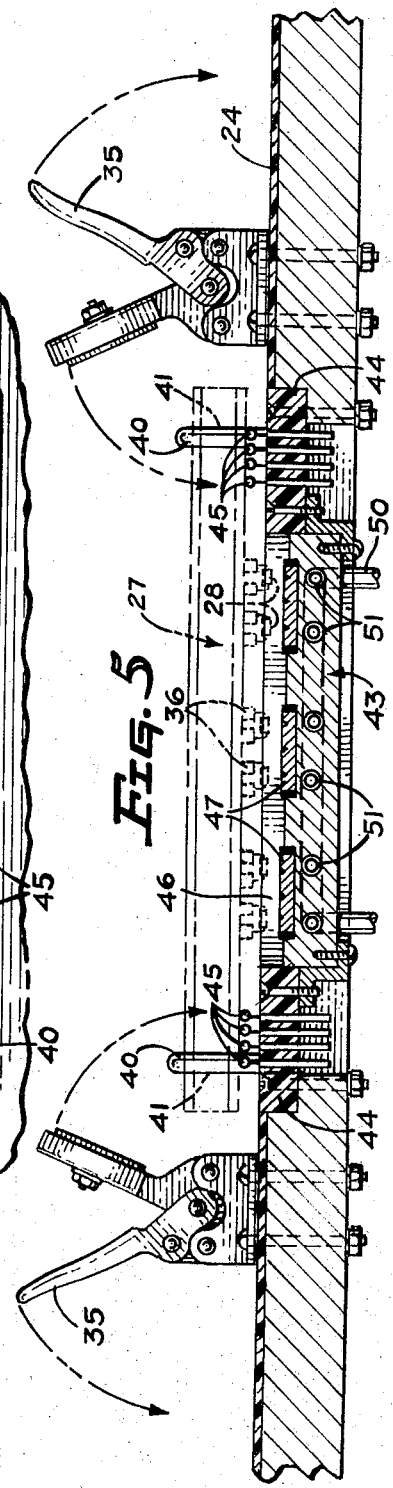

CONTINUITY TESTING OF SOLID STATE CIRCUITRY DURING TEMPERATURE CYCLING

BACKGROUND OF THE INVENTION

This invention relates to inspection systems for solid state circuitry and more particularly to the testing of the continuity of circuits on a plurality of chips over a wide range of temperatures by scanning repeatedly in the presence of two different potentials, such as positive and negative probing pulses, the circuits on the chips as the temperature of the chips is varied over a given range.

The rapid repeated probing or interrogation of solid state circuits on the chips is accomplished by repeatedly energizing each circuit on each chip during controlled temperature changes of the chips. The continuity of each circuit on each chip is then analyzed to yield information as to its condition under temperature conditions within the given range.

Plastic encapsulated, integrated circuits are prone to intermittent open circuit conditions at bonding connections during thermal variations of the circuits since leads bonded or embedded in the plastic are stressed when the temperature of the plastic changes. Since most solid state circuitry on chips are now encapsulated with plastic, inspection of these chips under various temperature conditions before use is needed.

DESCRIPTION OF THE PRIOR ART

Heretofore methods and apparatus have been used to test continuity under temperature conditions by utilizing an oscilloscope to monitor the circuit conditions of an encapsulated integrated circuit when the encapsulated device was heated by a hotplate positioned in a test box and tested under one or more heated conditions.

The oscilloscope method is slow and cumbersome, especially when applied to the procedures employed in connection with equipment for inspecting a large number of devices at many different temperature levels.

SUMMARY OF THE INVENTION

Therefore, in accordance with the invention claimed, a new method and apparatus is provided for testing plastic encapsulated, integrated circuits mounted on chips for intermittent bond conditions during a change of thermal conditions over a given range. To accommodate the directional characteristics of integrated circuit elements, two different potentials such as, for example, positive and negative potentials or probing pulses, are employed in the testing procedure.

It is, therefore, one object of this invention to provide a new method and network arrangement for testing plastic encapsulated integrated circuits mounted on chips.

Another object of this invention is to provide a new and improved method and apparatus for testing plastic encapsulated integrated circuits mounted on chips during a change of thermal conditions.

A further object of this invention is to provide an improved apparatus for constantly monitoring a plurality of integrated circuits on a plurality of chips under controlled thermo-electric conditions.

A still further object of this invention is to provide improved test equipment utilizing a controlled thermo-electric device to expose a number of integrated circuits to a thermal stress cycle of short duration while the circuits in the presence of two different potentials, such as positive and negative pulses are monitored to detect intermittent circuit connections.

A still further object of this invention is to thermally cycle simultaneously a plurality of encapsulated integrated circuits from approximately 25° to 100° C. and back to 25° in less than approximately a 2 minute cycle.

A still further object of this invention is to provide an improved testing apparatus for simultaneously testing a plurality of linear and digital integrated circuits with up to 24 pins.

A still further object of this invention is to provide a network apparatus for testing a plurality of circuits under various temperature conditions which sets error latch indicators to identify the locations of detected open lead connections.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawing.

FIG. 2 is a partial enlarged front view of the console showing the testing panel, test pad and mounting board assembly for clamping down on the test pad.

FIG. 3 is an enlarged partial perspective view of one of the integrated chips in position for insertion in a socket for mounting on the mounting board shown in FIGS. 1 and 2.

FIG. 4 is an enlarged top view of the test pad shown in FIGS. 1 and 2.

FIG. 5 is an enlarged partial cross-sectional view of FIG. 4 taken on the line 5—5 with the mounting board shown in dash lines in position for testing chips.

DESCRIPTION OF THE PREFERRED EMBODIMENT

Figure 1:
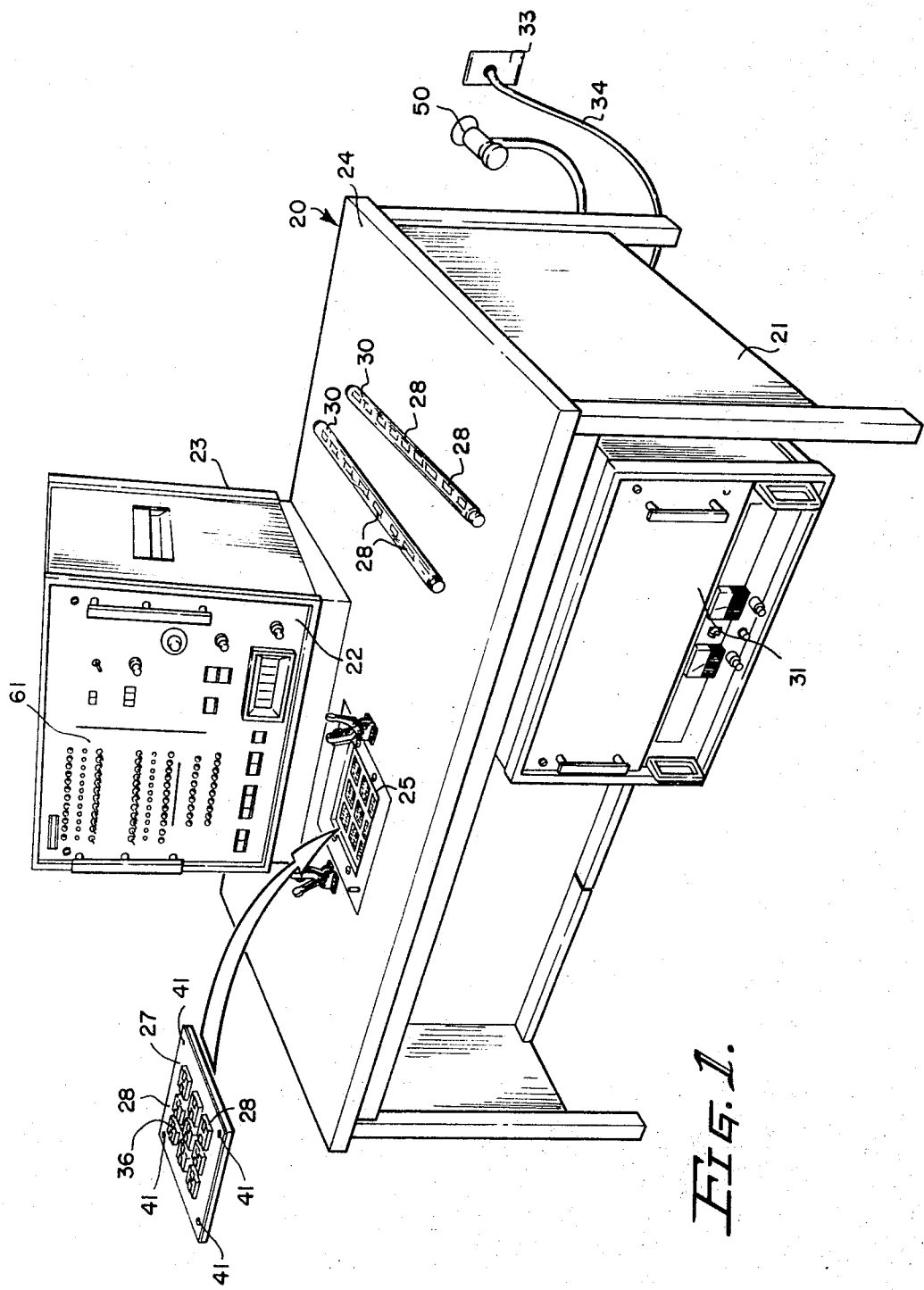
FIG. 1 is a perspective view of the testing console of the thermal intermittent tester disclosed embodying the invention.

Referring more particularly to the drawing by characters of reference, FIG. 1 discloses a console 20 comprising inspection equipment for solid state circuitry formed on chips wherein all of the circuits on a plurality of chips are sequentially scanned repeatedly in the presence of two different potentials, such as positive and negative probing pulses during temperature variation of the chips over a given range for detecting continuity of the circuits on the chips.

CONSOLE

The console comprises a desk-like structure 21 having a display panel 22 forming a part of a cabinet 23 mounted on its desk top 24. A test pad 25 is fixedly mounted on the desk top in convenient reach of an operator (not shown) for detachably mounting a test board 27 thereon. The test pad is provided for cyclically changing the temperature of a plurality of encapsulated integrated circuits mounted on chips 28 for checking circuit conditions during the changing of temperature conditions of the chips.

In order to inspect large numbers of chips before assembly in sophisticated electronic gear, it is necessary that a plurality of these chips be mounted and simultaneously tested. The mounting and testing procedure must be rapid and accurately done, with the location of a faulty chip on the mounting board embodying an intermittent circuit condition easily identifiable.

When shipped to a user, the chips are usually packaged in transparent tubes 30 such that they are maintained in axial alignment, thereby making it possible to remove them from the tube one at a time.

The console is provided with an electric source of power mounted in a pull-out drawer 31 which provides the potential to control equipment mounted in cabinet 23. The power equipment is provided with AC power from a wall outlet 33 through an electric cord 34.

FIG. 2 is an enlarged view of the desk top 24 and display panel 22 and illustrates the clamping means 35 which are used to clamp the test board onto the pad during a testing operation. Each chip is mounted in a socket 36 which forms a part of the test board.

As shown in FIG. 3, the chips are mounted in the sockets by positioning their lead wires 37, which are arranged to extend laterally from the chips and through passageways 38, which extend through the socket and make contact with etched circuitry formed on the top and bottom of the test board.

Since the chips are the particular circuitry mounted thereon are of no patentable importance herein, it should suffice to say that the chips, components and circuits formed thereon should be conductive in the presence of two different potentials, such as positive and negative pulses, under all temperature conditions to which they may be submitted. Usually these chips are plastic encapsulated, and during a change of temperature, the plastic stresses the lead wires such that occasionally under certain temperature conditions, an open circuit is created at the bonding of the lead-in wires to the circuit conductors or components. This, as well as other connections on the chips, may be affected by temperature changes so that pretesting at various temperatures is desirable in order to build dependable equipment.

In accordance with the invention claimed, a new and improved method and apparatus is disclosed for testing a plurality of chips under varying temperature conditions. For purposes of illustration, eighteen chips are mounted on the test board 27, as shown in FIGS. 1 and 2, with each chip having 24 lead-in conductors 37 which extend through passageways 38 in sockets 36 for making contact with various circuits on the top and bottom of the test board 27.

As mentioned before, test pad 25 is cycled through a given temperature range by means which will hereinafter be described. The temperature of the test pad 25 is sensed by a thermocouple 39 which is mounted on one of the sockets and is shown in FIG. 2 as being mounted on the center-most socket on test board 27. The thermocouple is provided with a plurality of leads which extend through passageways 38 in this socket for making contact with the display panel for indicating temperature conditions of the test pad.

In order for the thermocouple and the eighteen chips mounted thereon to be heated and cooled under controlled conditions by test pad 25, test board 27 must be inverted from the position shown in FIG. 2 when it is placed on test pad 25 and clamped thereto by clamping means 35. FIG. 5 shows the test board 27 inverted from the position shown in FIG. 2 and placed over test pad 25. Alignment occurs by inserting pins 40 extending laterally upwardly from test board 25 into alignment apertures 41 arranged in the corners of test board 27.

The test pad 25 comprises a heat conductive base 43 for a heat sink having mounted around its outer periphery an insulative board 44 supporting a plurality of upstanding spring biased pins 45. Pins 45 are connected to circuitry in the cabinet 23, as will be hereinafter described. Since the pins are spring biased outwardly of test pad 25, the pins will make a firm electrical contact with the circuits on test board 27 when this board is clamped onto test pad 25, as shown in FIG. 5.

The center of test pad 25 is dished out at 46 to house on a planar surface parallel with the top surface of the test pad a plurality of thermoelectric devices 47 formed as flat plates which are assembled to be individually replaceable and are capable of cycling in two minutes or less from approximately 25° to 100° C. and back to 25° C. Optimum performance should be approximately 1 minute with controllability to lengthen the excursion rate. These thermoelectric devices have heat pump characteristics.

Such devices are sold in the marketplace and can be obtained from Cambion Thermoelectric Products of Cambridge, Massachusetts. Each plate is a semiconductor having electrical resistivity between the metal and insulators. The electrical conductivity of this material increases with increasing carrier concentration and the Seebeck effect decreases with increasing carrier concentration, i.e., when two dissimilar conductors are connected and if the junctions are maintained at different temperatures, an emf can be observed in the circuit. The thermal conductivity has two components, a lattice thermal conductivity independent of the carrier concentration and the electronic thermal conductivity which is proportional to the carrier concentration.

At open circuit, the thermoelectric device is a simple thermocouple. A temperature gradient maintained across the plates will cause a potential to appear across terminals connected one to each plate. If a circuit between these terminals is electrically completed through a battery or other DC source, heat is absorbed at one junction, causing it to cool, and heat is rejected at the other junction, causing it to heat. This is simultaneously a thermoelectric heater and cooler, i.e., a heat pump. It should be noted that by simply reversing the current, the flow of heat is also reversed.

These thermoelectric dvices are only as strong as the semiconductor materials used in fabrication, and since they are arranged in multiple-junction series configurations consisting of N-type and P-type Bismuch Telluride alloys, they exhibit strong cleavage characteristics but low mechanical strength. Chemically bonded to both ends of the N and P elements are nickel interface barriers. These interface barriers prevent impurity diffusion (with resulting performance degradation) from the solder-copper interface to the Bismuch Telluride elements.

To ensure proper performance of low current, high voltage thermoelectric devices, the devices should have flat mounting surfaces for chips held against them.

An important and often critical factor in the use of thermoelectric devices is the heat sink performance required to meet specific temperature pumping criteria. The performance characteristics for the thermoelectric device will vary as a function of the heat sink temperature. For optimum thermoelectric device performance, liquid cooling is used to control the heat sink temperature. The heat sink temperature value will rise above the ambient temperature value as a function of total power dissipated times the effective thermal resistance of the heat sink.

In the disclosed invention, water is used to cool the heat sink for the thermoelectric devices. Water under pressure from a source 50, shown in FIG. 1, is transmitted through suitable conduits 51 in the base 43 of test pad 25 (FIG. 5) and are arranged to pass therethrough in a serpentine manner such that the base is cooled uniformly in the areas of the mounting of the chips 28 and their sockets 36. The water, after passing through the base, is drained off to a sump or a sewer through a drain pipe (not shown).

Figures 6, 7:
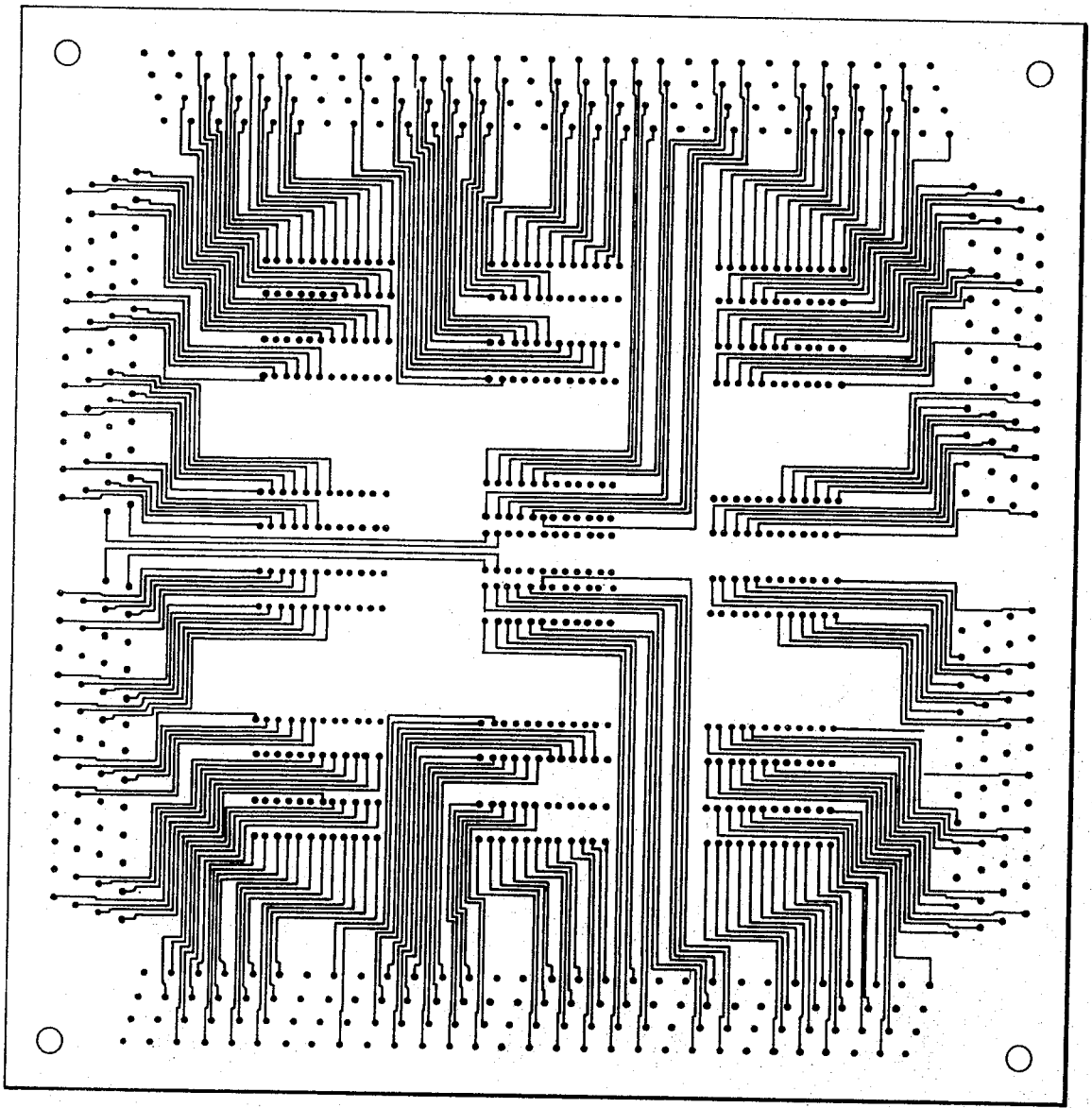
FIG. 6 is a plan view of the circuitry shown on the top of the mounting board.
FIG. 7 is a side view of the mounting board shown in FIG. 6.
Figure 9:
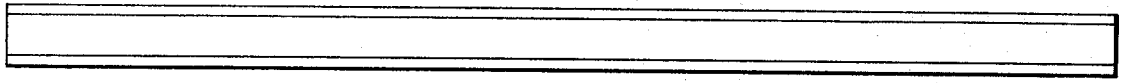
FIG. 9 is a side view of the mounting board shown in FIG. 8.
Figure 8:
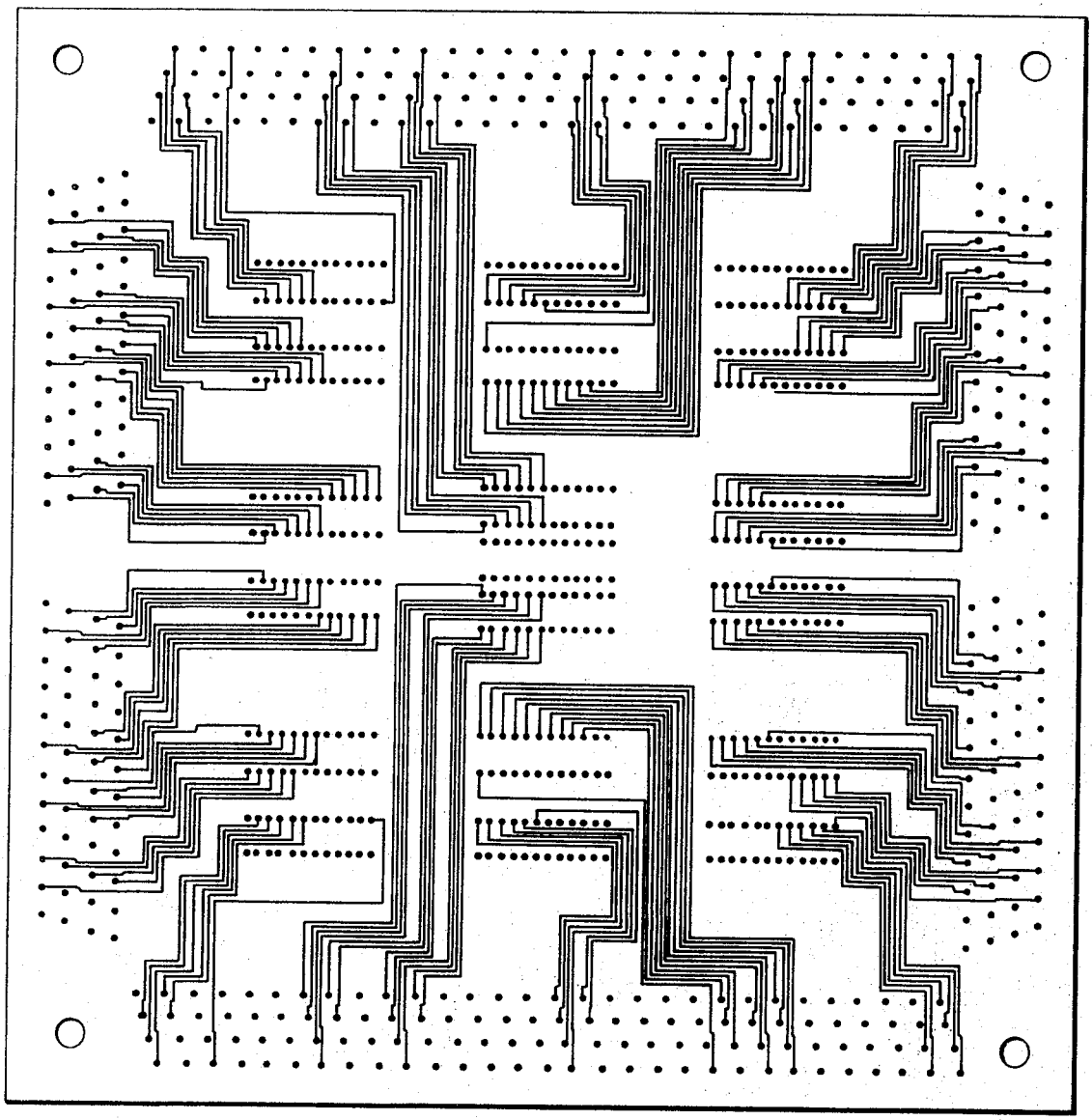
FIG. 8 is a plan view of the bottom of the mounting board showing the circuitry formed thereon.

FIGS. 6 and 8 illustrate the circuitry on the top and bottom sides of the test board 27. As well known, connections between the circuits on both sides of the board are accomplished by the lead wires of the chips and sockets extending through apertures in the test board.

The invention achieves its objects, in essence, by providing duplicate or multiple components and circuits arranged to be interrogated in the presences of a series of two different potential or probing pulses controlled by a simple sequential switching circuit for controlling the interrogation process. All of the circuits interrogated on the chips are of a continuing nature so that when they are energized by a flow of current from a charging source continuity will be indicated.

The invention is not limited to the number of chips and their individual circuits checked, but as disclosed herein, comprises 18 chips with 24 circuits each. The interrogation pulse repetition rate determines the time or cycle for each group of chips checked.

LOGIC CIRCUITS

Figure 10:
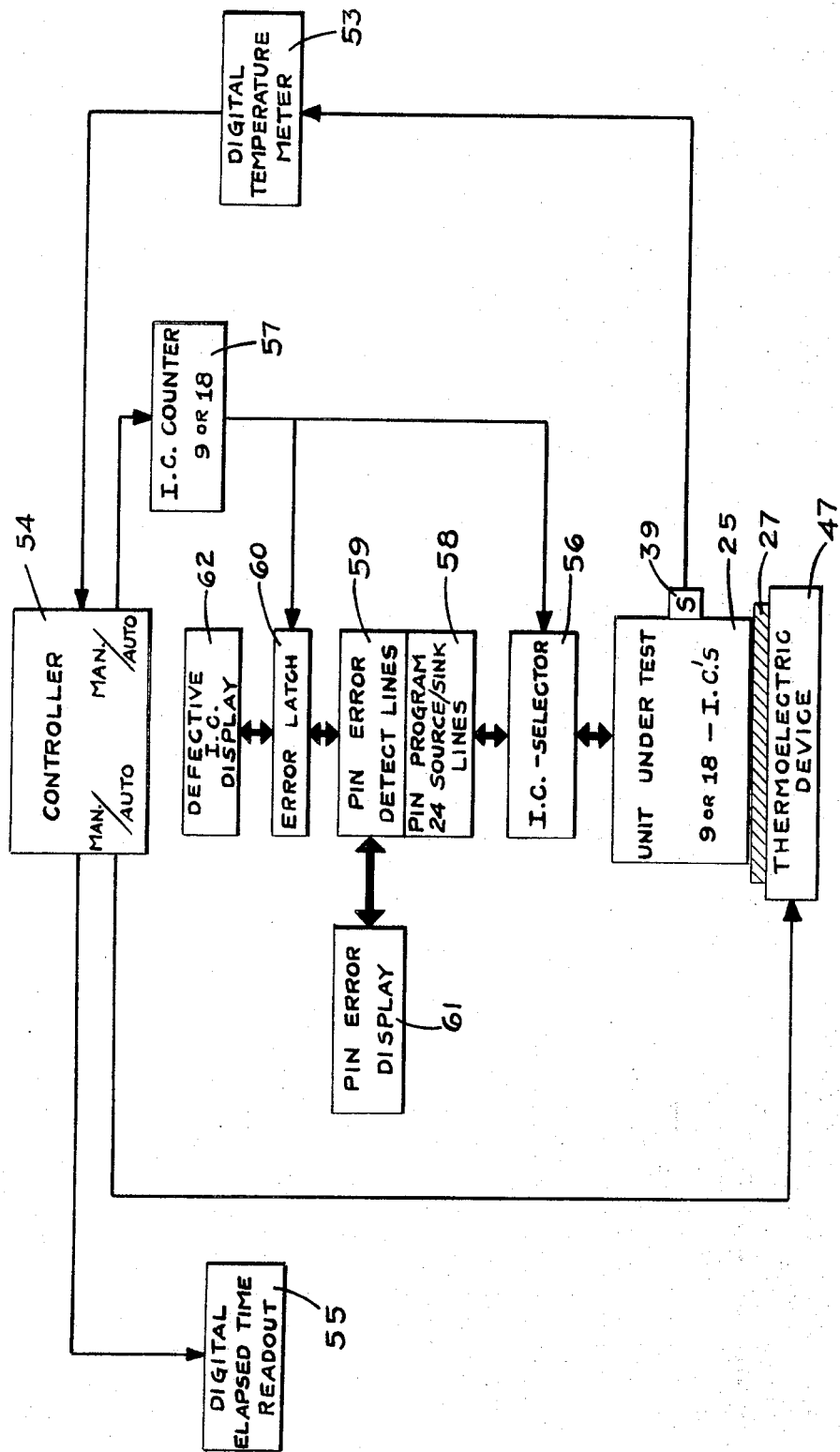
FIG. 10 is a high level block diagram of the thermal intermittent tester disclosed.

FIG. 10 discloses in a schematic or block diagram form the invention disclosed.

The thermoelectric devices 47 are mounted on the heat conductive base 43 which is cooled as heretofore explained. The chips 28 to be tested are mounted on test board 27, which is clamped to the test pad 25 of which the thermoelectric devices form a part. On the test board 25 is mounted thermocouple 39, which is connected through a digital temperature meter 53, shown in FIGS. 1, 2 and 10, to a controller 54 mounted in cabinet 23. Controller 54 is connected to a digital elapsed time clock 55.

Under test, each of the chips mounted on test pad 25 is connected to an integrated circuit selector 56 whose function is to selectively, sequentially interrogate the chips and their circuits under proper energizing conditions, such as pulsing conditions provided by controller 54 through an integrated circuit counter 57.

The integrated circuit selector 56 transmits information to continuity detectors 58 which are in communication with a plurality of control lines 59 which energize error latches 60 if an open circuit is detected in any of the chips interrogated. These error latches are pulsed by the integrated circuit counter 57 in unison with the pulsing of the circuits on chips 28.

Errors detected on pins connected to the chips interrogated are displayed through lights on pin error display 61 forming a part of display panel 22. An indication of the chip containing a defective circuit is displayed in the defective integrated circuit display 62, also forming a part of display panel 22.

Figure 11:
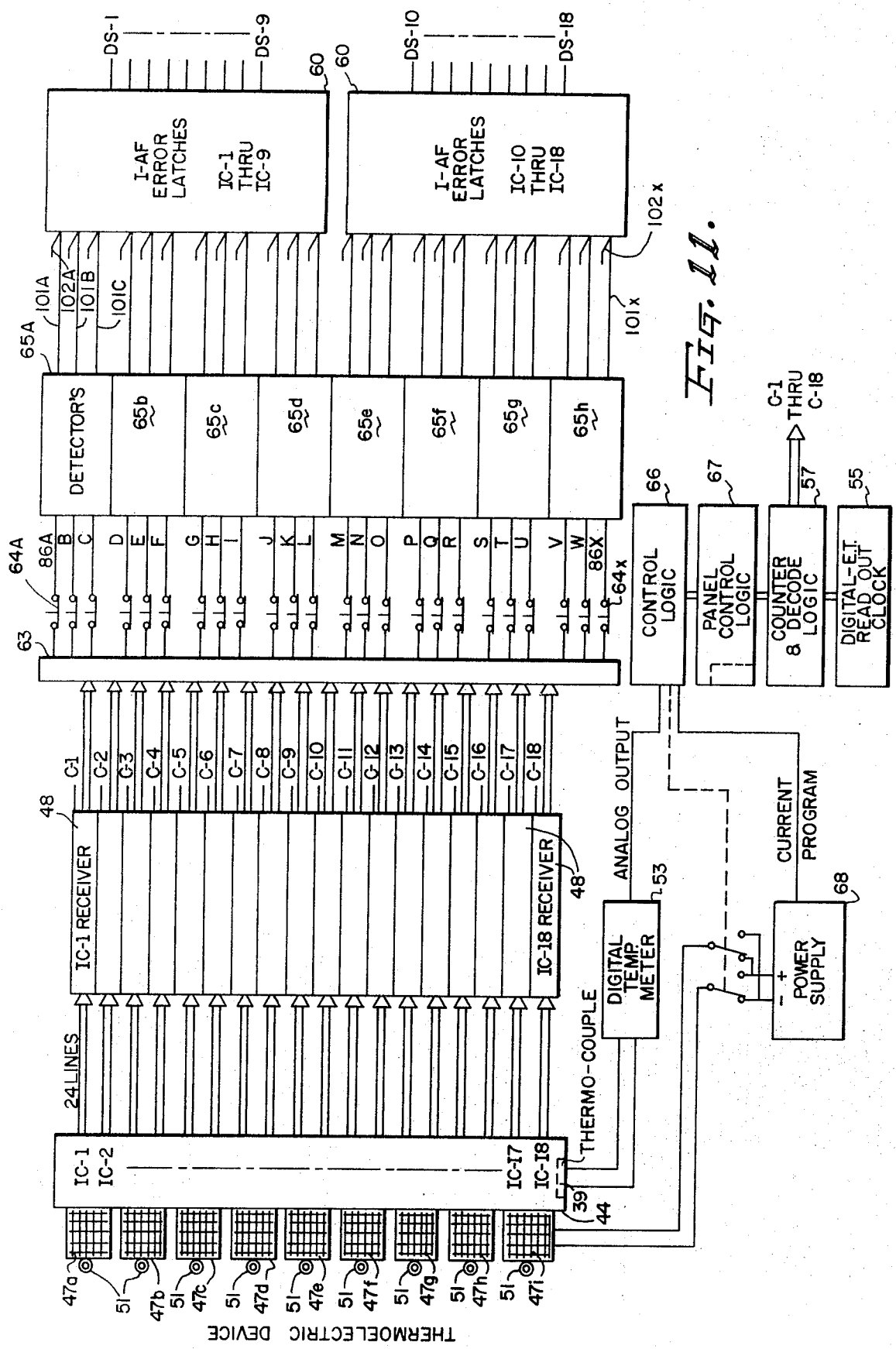
FIG. 11 is a block diagram of the thermal intermittent tester disclosed in FIG. 10 illustrating in more detail some of the blocks illustrated thereon.

FIG. 11 illustrates a block diagram similar to the one disclosed in FIG. 10 but illustrating in more detail some of the blocks shown in FIG. 10. FIG. 11 shows each of the thermoelectric devices 47, identified more specifically by reference numerals 47a–47i being cooled symbolically by the conduits 51. Mounted around the thermoelectric devices is the insulative board 44 containing 436 pressure pins 45. These pins connect the 24 circuits of each chip and the thermocouple to eighteen receiver boards 48 and a temperature meter for interrogating the circuits on the chips.

Each receiver board has most of its lead-in wires connected to a common bus bar 63, as shown in FIG. 11. The bus bar is connected through 24 switches 64 to a plurality of detector boards 65a–65h containing detector circuits of various types, hereinafter described. Each of the detector boards are connected through 24 lines to 18 error latches 60.

The controller 54 of FIG. 10 is broken down in FIG. 11 into control logic and panel control logic blocks 66 and 67, respectively. The integrated counter 57 includes decode logic. Electric power is supplied by power source 68, which is mounted for easy access in drawer 31 of console 20.

RECEIVER BOARD

Figure 12:
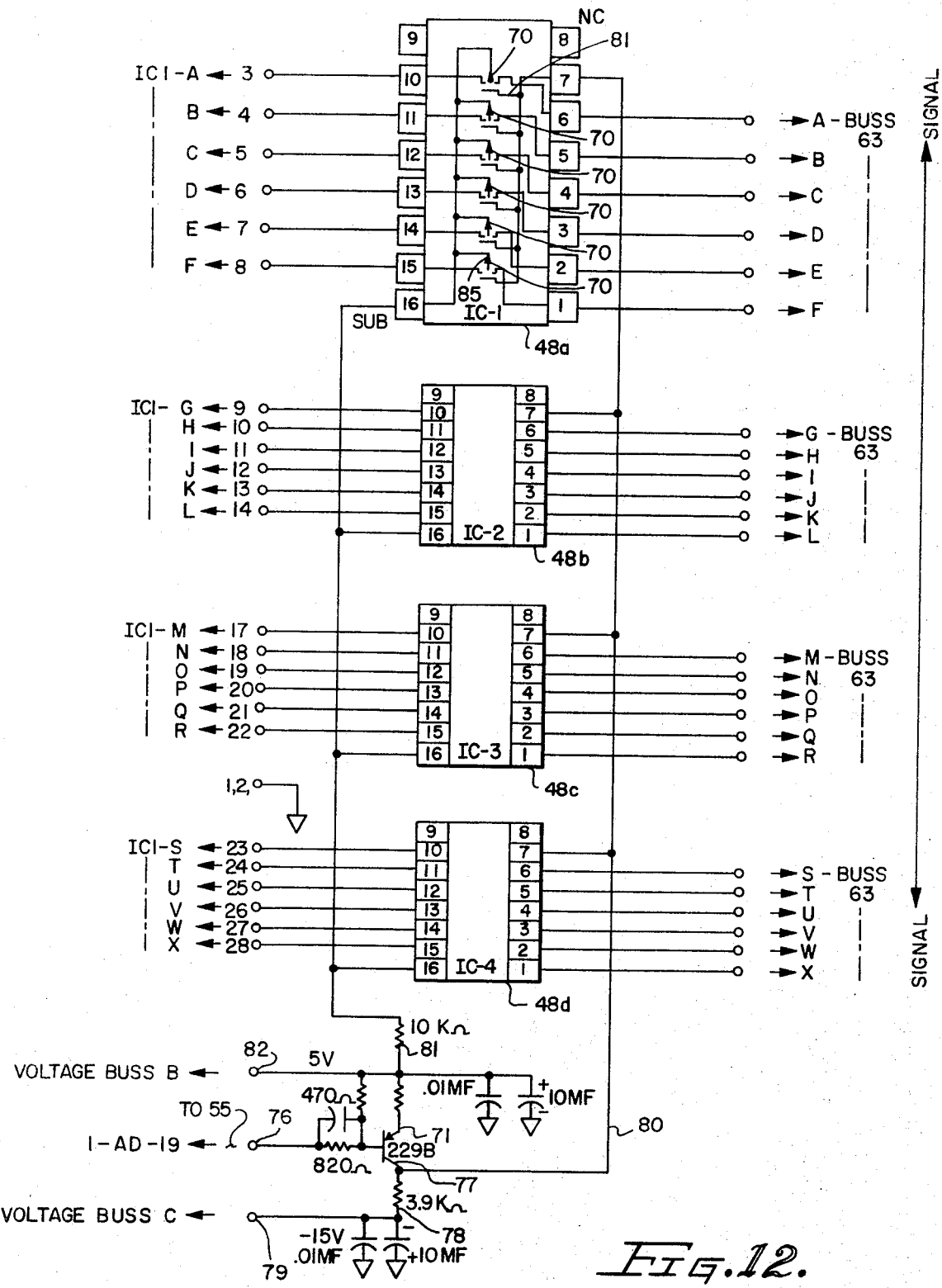
FIG. 12 is an illustration of the circuitry of one part of one of the integrated circuit receiver boards shown in FIG. 11 with the other portions thereof duplicating that portion shown.

FIG. 12 discloses in detail the circuitry of one of the eighteen receiver boards 48. Each receiver board has mounted on it four groups of integrated circuits identified as 48a, 48b, 48c and 48d. Each group of integrated circuits comprise six field effect transistors 70. Each field effect transistor utilizes two ohmic contacts and one p-n junction. The junction is always reversed-biased, thereby controlling the flow of current between the ohmic contacts. Although FIG. 12 illustrates in detail only the integrated circuits of group 48a, it should be recognized that the integrated circuits of groups 48b, 48c and 48d are identical.

The ohmic devices of each field effect transistor 70 in each group 48a–48d are connected through terminals 10–16 of each group to Bismuth 3–8 for group 48a, terminals 9–14 for group 48b, terminals 17–22 for group 48c and terminals 23–28 for group 48d, as shown in FIG. 12. Each of terminals 3–14 Bismuth 17–28 are connected to the terminals A through X of one of the chips, for example, chip IC-I mounted for test on the test pad 25.

In order to control each field effect transistor 70 of the integrated circuits in groups 48a through 48d on the board of each receiver 48, a control circuit 80, shown in FIG. 12, is provided. This control circuit embodies a transistor 229B comprising a base connected through a resistor to a terminal 76 connected to receive pulses from a source of clocking pulses 55. Its collector 77 is connected through a suitable resistor 78 to a minus 15 volt source 79, as shown. The collector 77 of transistor 229B is also connected through conductor 80 to a common gate 81 of each of the field effect transistors 70 of the circuits 48a, 48b, 48c and 48d of the receiver boards 48. The emitter 71 of transistor 229B is connected to a substantially 5-volt source of potential 82 through a biasing resistor and further through resistor 81 to a common base 85 of each of the field effect transistors 70.

Each of the conductors 1 through 6 leading out of each of the circuits 48a–48d of the receiver boards 48 are connected to buses 63a–63x. In other words, like common conductors on each chip being tested are connected to a common bus 63. Thus, there are 24 common conductors 63 with all "A" conductors of all of the 18 chips being connected to a common bus 63a, etc. This occurs in a sequential manner through the effects of an oscillator and counter 57 through suitable logic, hereinafter explained.

Each of the 24 conductors on each of the 18 chips capable of being tested at one time on test pad 25 are connected through switches 64a–64x to lead-in conductors 86a–86x of detector boards 65a–65h (See FIG. 11).

DETECTOR BOARD

Figure 13:
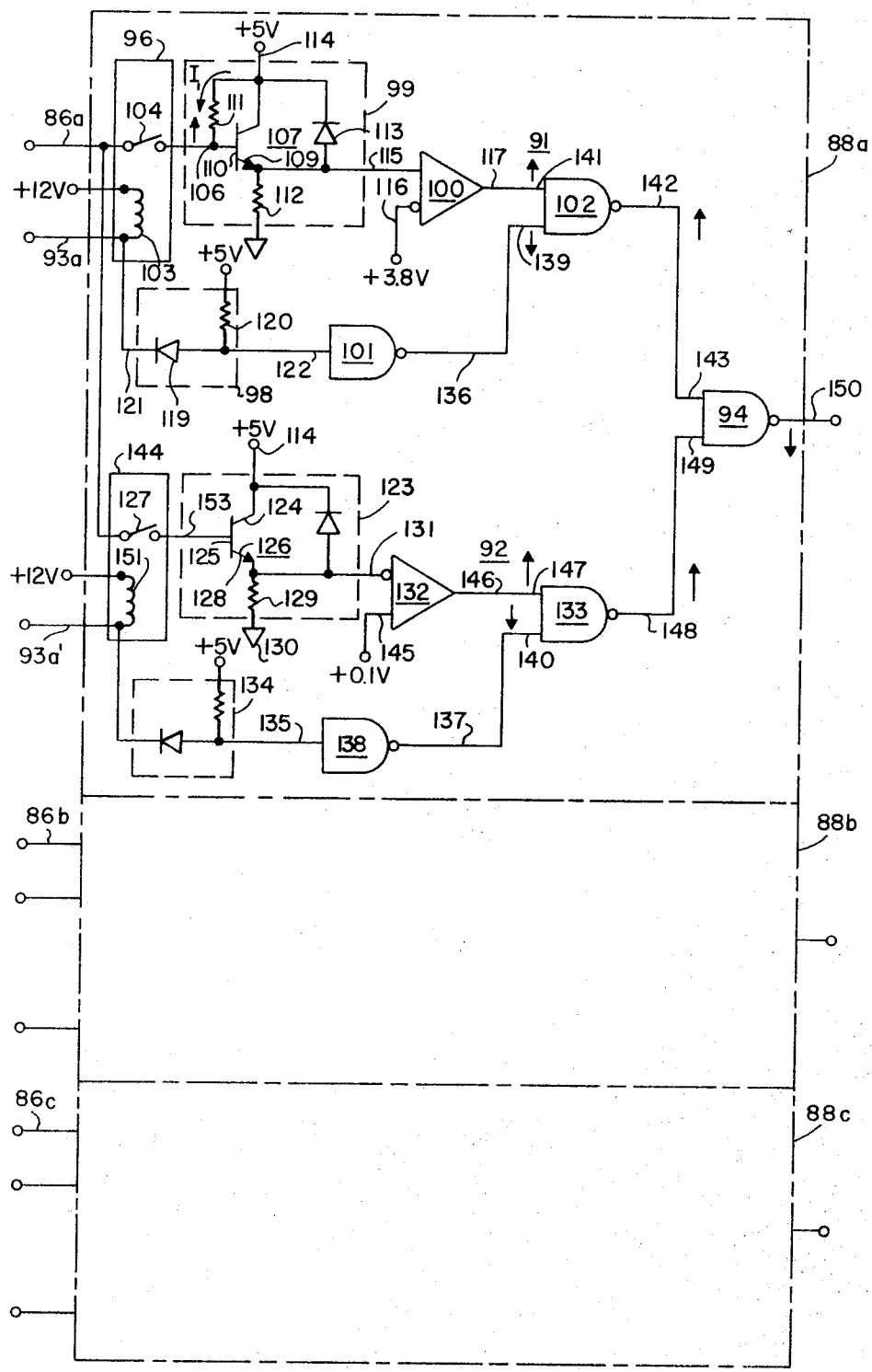
FIG. 13 is an illustration of the circuitry of one part of one of the detector boards shown in FIG. 11 with the other blocks thereof duplicating the portion shown.

FIG. 13 illustrates a detector board 65a which is representative of all of the other detector boards 65b through 65h with only the circuitry on one-third of the board identified by reference character 88a shown. The other portions of the board, namely portions 88b and 88c, are identical to portion 88a. Each conductor 86a–86x on each of the detector boards 65a–65x is connected to switches 64a–64x, respectively, as shown in FIG. 11, and in turn to the conductor on the chip being interrogated.

FIG. 13 discloses the detector boards as comprising networks having an upper channel 91 and a lower channel 92, channel selector circuits 93a and 93a' and an output gate 94. Both channels are connected to conductor 86a, as shown. Conductor 86a connects the circuitry of the detector board to the integrated circuit under test. When conductor 93a is connected to a given potential, such as ground and conductor 86a is connected to a given circuit of the chip under test, channel 91 is energized. When conductor 93a is interrupted and conductor 93a' is connected to a given potential, channel 92 is energized. When both conductors 93a and 93a' are interrupted, neither channel 91 nor channel 92 is selected and energized.

Channel 91 comprises an enabling relay 96, a diode gate 98, a biased amplifier 99, a comparator 100 and two NAND gates 101 and 102.

Relay 97 has a coil 103 and a contact mechanism 104 which is normally in the open position when coil 103 is not energized. The upper end of coil 103 is connected to a positive voltage source shown as "+12V". Coil 103 is energized by connecting its lower end to a given potential, such as a lower voltage than the +12 volts, namely ground through conductor 93a. When coil 103 is thus energized its contacts 104 are closed, connecting input terminal 106 of amplifier 99 to one circuit on the chip or unit under test.

Amplifier 99 includes resistors 111 and 112, diode 113 and transistor 107. When contacts 104 of relay 97 are open, a current $I_1$ flows from the +5V source 114 through resistor 111 into base 110 of transistor 107. Current $I_1$ is of sufficient amplitude to turn on transistor 107 or to set it in a near saturation condition, i.e., its anode-to-cathode voltage will be in the region of 1/2 volt or less. The emitter of transistor 107 and hence input terminal 115 of comparator 100 are approximately 4.5 volts above ground. When contacts 104 of relay 97 are closed, the condition of transistor 107 is dependent upon the voltage present on conductor 86a, which is connected to the chip or unit under test. A negative or low positive potential or pulse on line 86a will tend to turn transistor 107 off so that the potential at its emitter 109 will also be at or near ground potential. If conductor 86a is connected to a positive potential or pulse or if line 86a is terminated in a high impedance such as an open circuit at the unit under test, transistor 107 will then be in the "on" condition as in the case when contacts 104 of relay 97 were open. Amplifier 99 thus delivers a high or a low potential to input terminal 115 of comparator 100 depending upon the signal level at the input of conductor 86a.

Comparator 100 is a type of integrated circuit which compares two input potentials and delivers at its output terminal a voltage level indicating which of the two potentials is more positive. Comparator 100 has two input terminals 115 and 116 which are connected to the two potentials which are to be compared, and it has an output terminal 117. Input terminal 115 is known as a "non-inverting" input terminal because an input at this terminal which is more positive than the potential at the other input terminals will cause the output terminal 117 to be at a relatively high positive voltage with respect to ground. Input terminal 116 is shown with a small "bubble" at its entrance and is known as an "inverting" input terminal because a signal at this input terminal causes the output terminal 117 to be at a relatively low positive potential or at a potential which is negative with respect to ground. The comparator is shown as typically represented and the discussion of its operation as outlined above is a amplified by many texts and handbook which are readily available. Specifications for a typical comparator are given on pages 3-91 and 3-92 of The Integrated Circuits Catalog for Design Engineers, First Edition, published by Texas Instruments, Inc.

Diode gate 98 includes a diode 119 and a resistor 120. The input terminal 121 of diode gate 98 is at the cathode of diode 119; the output terminal of the gate is at the anode of diode 119. When conductor 93a is grounded, the cathode of diode 119 is at ground potential. Current flowing from the +5V source through resistor 120 and through the diode from anode to cathode raises the anode potential to approximately 0.6 volts above ground. The output of the gate for this condition is thus approximately 0.6 volts as delivered to input terminal 122 of NAND gate 101. When conductor 93a is open, the cathode of diode 119 is connected to a +12 volts potential through coil 103 of relay 93. The cathode of diode 119 is thus more positive than the anode, and the diode is said to be reverse biased. Under this condition substantially no current flows through the diode or through resistor 120 and the anode of diode 119 as well as the input terminal 122 of gate 101 are at or near the +5 volt potential.

NAND gates 101 and 102 are commonly used logic circuits having one or more input terminals and one output terminal. If any or all of the input terminals are low (half a volt or less positive with respect to ground), the output terminals will be high (2 volts or more positive with respect to ground). If all input terminals are high (2 volts or higher), the output terminal will be low (less than one half volt). A NAND gate, such as NAND gates 101 and 138, having only one input terminal is called an inverter. In this case the output will be low when the input is high and the output will be high when the input is low.

With the exception of amplifier 123, the major network elements of channel 92 are the same as those employed in channel 91. Amplifier 123 is the same as amplifier 99 except that amplifier 123 had no resistor connected between collector 124 and base 126 of its transistor 126. In this case, there is no source of base drive current when relay contact 127 is open, and transistor 126 is thus turned off so that its emitter 128 is near ground potential. The same conditions are true when contact 127 is closed and conductor 86a terminates in a high impedance or connects to a low positive or to a negative voltage or voltage pulse. A positive signal level or pulse on conductor 86a with contact 127 closed supplies drive current into base 125, causing an amplified current to flow from collector 124 to emitter 128 of transistor 126. This same amplified current flowing through resistor 129 to ground terminal 130 produces a voltage drop across resistor 129 and sets a voltage level at emitter 128 that is within approximately 0.6 volts as positive as the signal on conductor 86a.

Channel 92 differs from channel 91 in a second respect: the output of amplifier 99 of channel 91 is connected to the non-inverting input 115 of comparator 100, whereas the output of amplifier 123 of channel 92 is connected to the inverting input 131 of comparator 132.

Output gate 94 is identical to gates 102 and 133. Operation of the detector circuit and signal levels at points throughout the network are dependent upon the connection of conductors 93a and 93a' and upon signals present on conductor 86a.

The following conditions exist when a channel selector switch (not shown) or potentials on conductors 93a and 93a' are zero or interrupted: The input terminals of diode gate 98 of channel 91 and of diode gate 134 of channel 92 are both at a positive 12 volts. The outputs of terminals 122 and 135 are thus at or near +5 volts. Output terminals 136 and 137, respectively, of gates 102 and 138 are thus both low, as are the corresponding input terminals 139 and 140, respectively, of gates 102 and 133. This condition is represented by the arrows pointing downward at input terminals 139 and 140.

Because contact 104 of relay 97 is open when conductors 93a and 93a' are interrupted, transistor 107 is "On" and a positive level exists at input terminal 115 of comparator 100. Because this positive level at noninverting input terminal 115 is more positive than the +3.8 volts present at inverting input terminal 116, the output terminal 117 of comparator 100 is also high, as indicated by the arrow pointing upward on the line connecting output terminal 117 of comparator 100 with input terminal 141 of gate 102. Because one of the input terminals (terminal 139) of gate 102 is low, the output terminal 142 of gate 102 is high, as indicated by the arrow pointing upward on the line connecting output terminal 142 of gate 102 to input terminal 143 of gate 94.

Contact 127 of relay 144 is also open when conductors 93a and 93a' are interrupted. Transistor 126 of amplifier 123 is thus in the "Off" condition and the input terminal 131 of comparator 132 is thus substantially at zero volts. Because the voltage at inverting input terminal 131 of comparator 132 is lower than the positive 0.1 volt reference connected to noninverting input terminal 145, the output of comparator 132 at terminal 146 is high, as indicated by the arrow pointing upward on the line connecting output terminal 146 of comparator 132 to input terminal 147 of gate 133. Because input terminal 140 of gate 133 is low, the output terminal 148 of gate 133 is high, as indicated by the arrow pointing upward on the line connecting output terminal 148 of gate 133 to input terminal 149 of gate 94.

Because both input terminals 143 and 149 of gate 94 are high, output terminal 150 of gate 94 is low, as indicated by the arrow pointing downward. A low level on terminal 150 leading to the error latch and indicator is a "no fault" condition and will not set the error latch.

Figure 14:
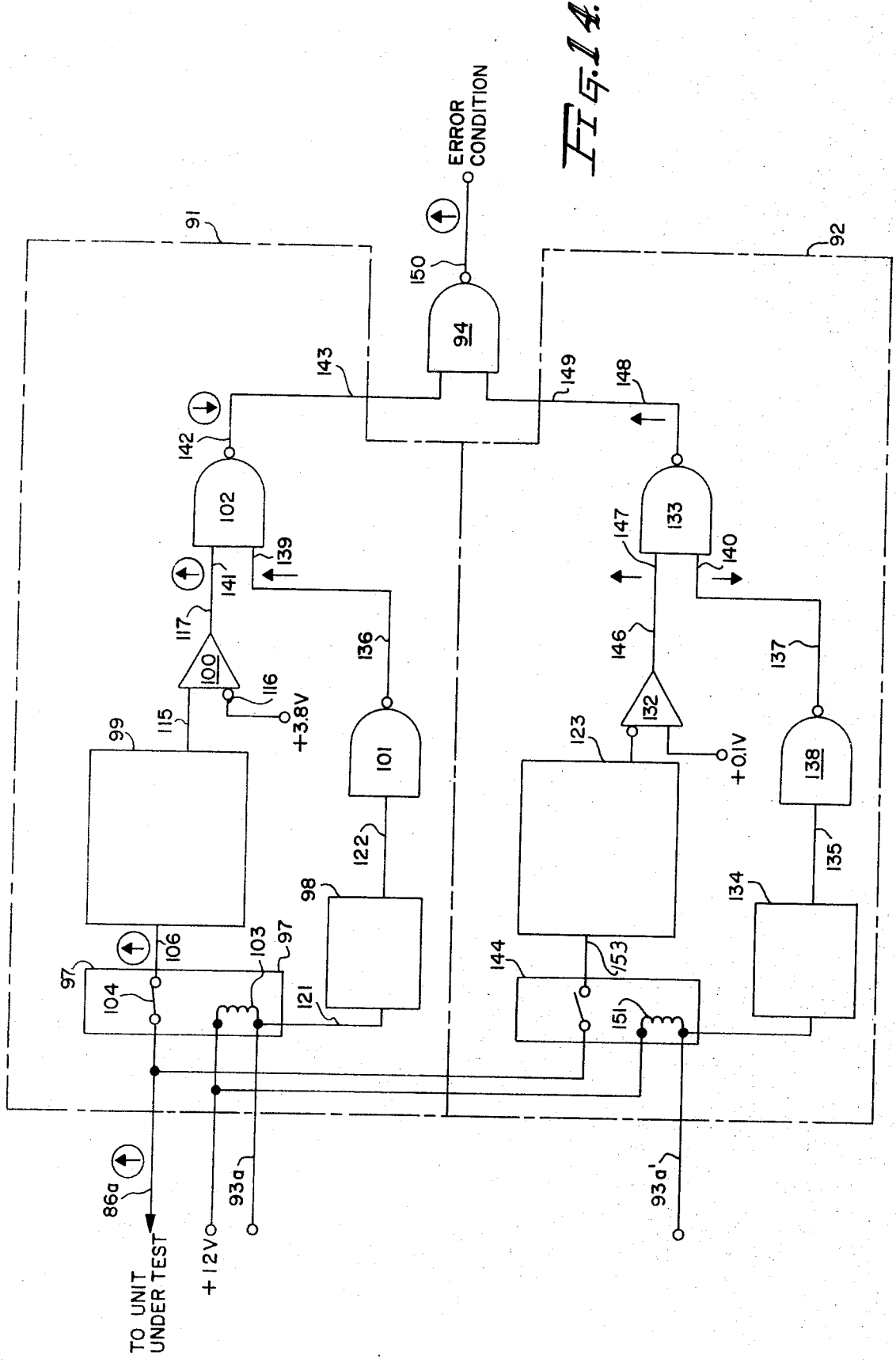
FIG. 14 is a partial view of the circuitry shown in FIG. 13 with relays set to enable the upper channel of the detector. The network is shown with circled arrows representing signal levels in the presence of abnormal conditions at the chips under test.

FIG. 14 shows signal levels existing when conductor 93a is connected to a lower potential than 12 volts, such as ground, to enable channel 91. When conductor 93a alone is connected to ground, for example, coil 151 of relay 144 is not energized and signal levels for channel 92 are the same as described above when conductors 93a and 93a' are interrupted. The signal at input terminal 149 of gate 94 is thus high, as indicated by the arrow pointing upward.

When conductor 93a is connected to a potential lower than 12 volts, such as ground, input terminal 121 of diode gate 98 switches from a high level (+12 volts) to a low level, such as ground potential. The signal on terminal 122 of gate 101 is also low, and the output terminal 136 of gate 101 as well as the input terminal 139 of gate 102 is high as indicated by the arrow pointing upward.

For the open condition of contacts 104 of relay 97 the signal level at input terminal 106 of amplifier 97 was high. For the closed condition of contacts 104 as shown in FIG. 14 and with continuity to ground or to a negative potential through a normal lead connection in the unit or circuit under test, the signal at input terminal 106 reverses to a low level. Ignore the arrows in FIG. 14 for the moment. A corresponding reversal of the signal at the input terminal 141 of gate 102 results. Signal levels at the outputs of gates 102 and 94 for these conditions are high and low, respectively, as derived on the basis of earlier exploration of gate operating characteristics. Again, the low output at the output terminal 150 of gate 94 indicates a "no fault" condition in the circuit or unit under test.

In FIG. 14, which represents the same circuit shown in FIG. 13 with details removed for the sake of clarity, some of the arrows pointing upward or downward are different than in FIG. 13. The circled arrows indicate signal levels in that part of channel 91 which are affected by conditions in the circuit or unit under test. More specifically, the circled arrows in FIG. 14 indicate signal levels corresponding to fault conditions in the circuit or unit under test.

If conditions in the circuit or unit under test are not normal, i.e., if the lead connection at the selected terminal of the chip or unit under test is open, the signal level at input terminal 106 of amplifier 99 will be high. Consequently, the output 117 of comparator 100 will be high, the output 142 of NAND gate 102 will be low, and the output 150 of NAND gate 94 will be high, indicating an error condition.

Figure 15:
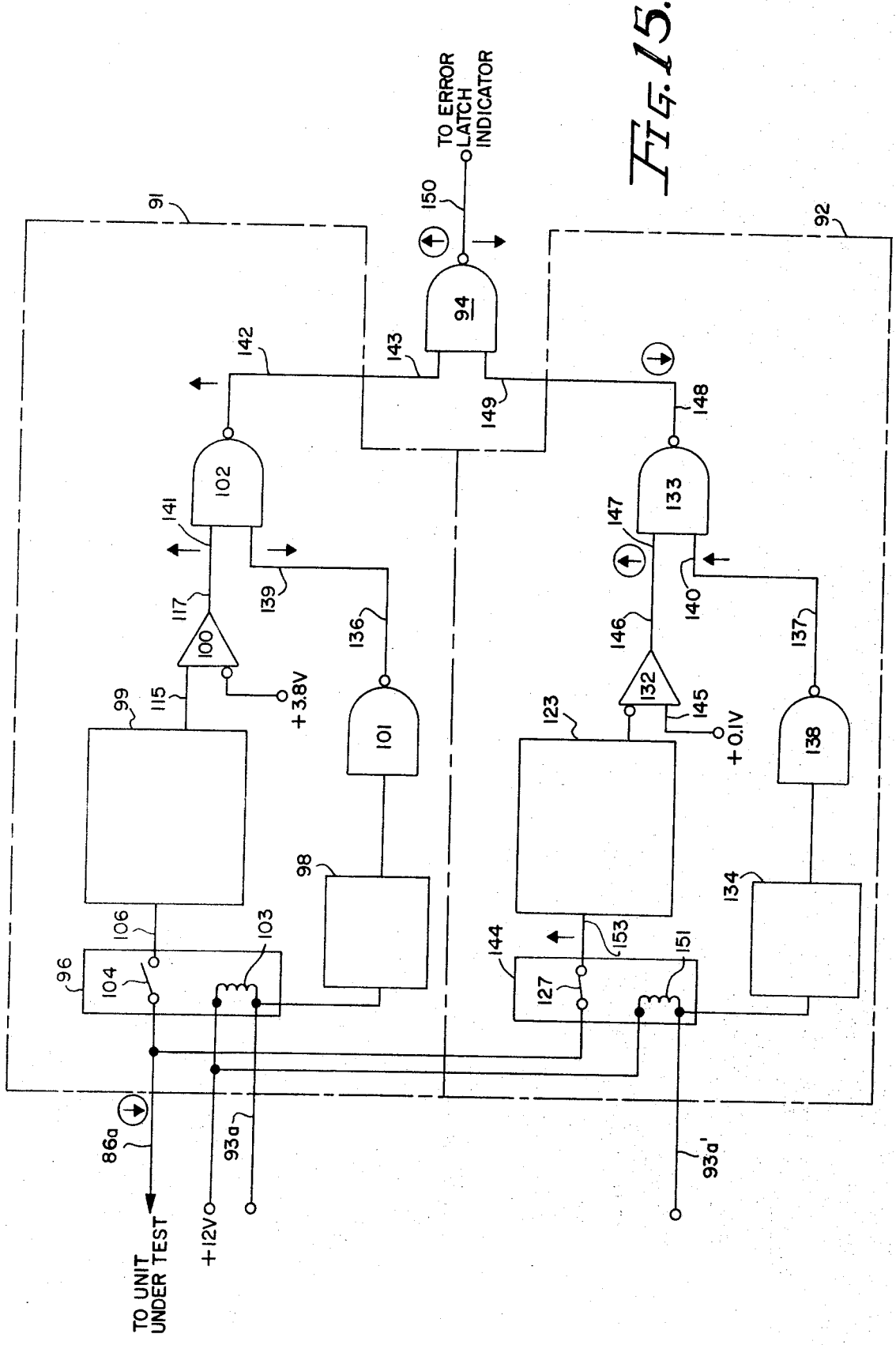
FIG. 15 is a partial view of the circuitry shown in FIG. 13 with relays set to enable the lower channel of the detector network shown with circled arrows representing signal levels in the presence of abnormal conditions at the chips under test.

FIG. 15 shows signal levels present throughout the detector network when conductor 93a' is connected to a given potential, such as ground, which energizes relay 151, closing contacts 127 as shown. The arrows pointing upward and downward again represent high and low signal levels prevailing in the case of normal or abnormal conditions at the chip or unit under test. Circled arrows indicate a "fault" or open-circuit condition at the chip or unit under test.

On the basis of the foregoing explanations of circuit operation, it is seen that a negative signal or pulse at input terminal 106 of amplifier 99 of channel 91 corresponds to a normal condition at the chip or unit under test, whereas a positive signal at input terminal 153 or amplifier 123 of channel 92 corresponds to an abnormal condition at the chip or unit under test. It is this feature which enables the detector network to detect faults with either positive or negative probing pulses. Selection of the appropriate channel is accomplished by a switch arrangement for grounding conductors 93a and 93a' or connecting them to a given potential which may occur by connecting them to another circuit on another chip.

Conductor 86a is connected to a particular terminal of the chip or unit under test. Other terminals of this chip and other units under test are connected to identical detector networks. When one of these other terminals is selected for test, conductors 93b, 93b' through 93x, 93x' of the other networks are interrupted or in open circuit condition.

ERROR-LATCH CIRCUITS

Figure 16:
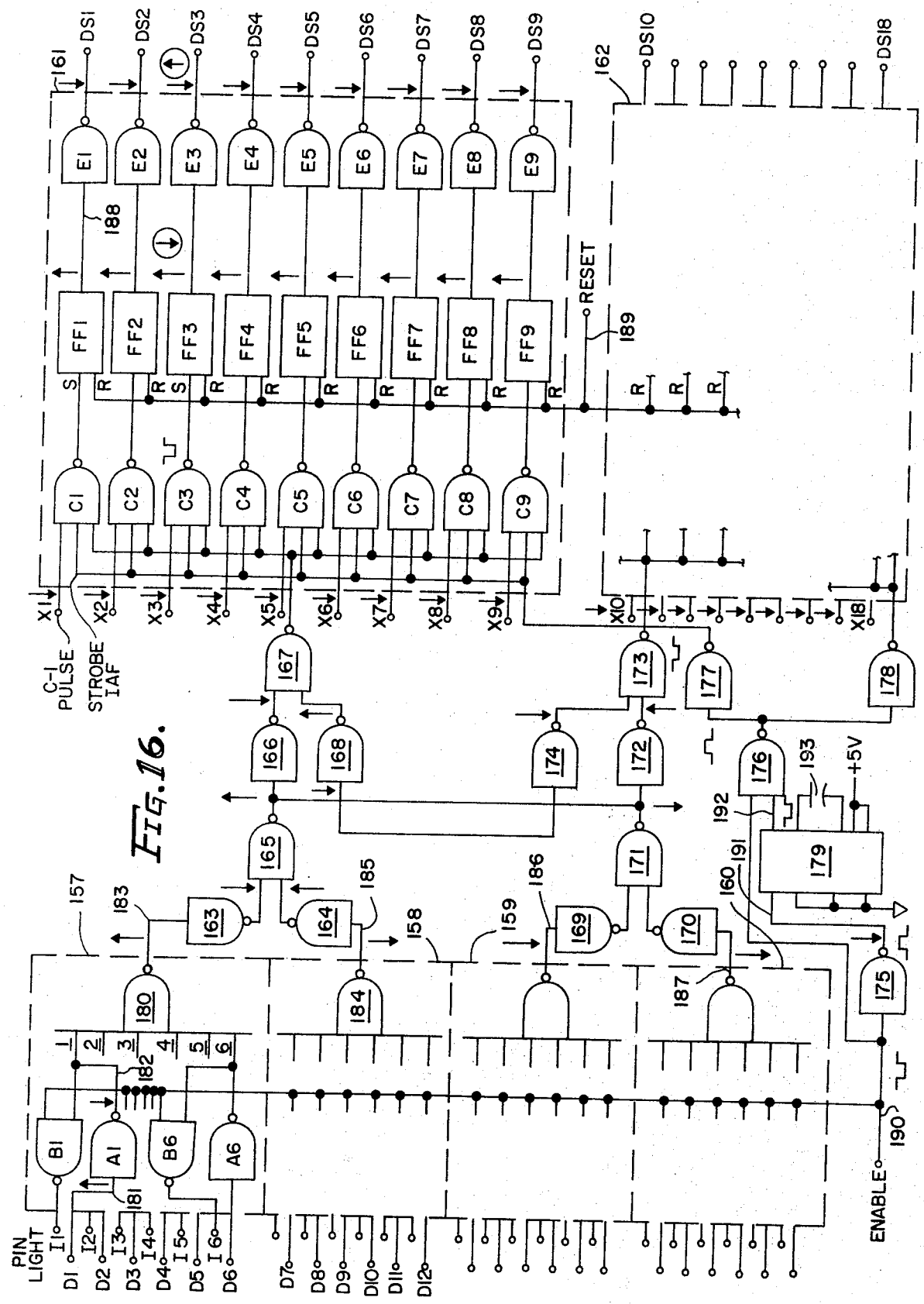
FIG. 16 is a logic diagram of the error latch blocks shown in FIG. 11.

The error latch circuits as shown in FIG. 16 include four identical input stages 157, 158, 159 and 160, and two identical output stages 161 and 162. Connecting the output stages to the input stages is a network of NAND gates including gates 163 through 174, inclusive. Gates 175 through 178 and monostable multivibrator 179 comprise the clock driver circuits.

Input stage 157 includes one six-input NAND gate 180 and six pairs of NAND gates, A1 and B1, A2 and B2, A3 and B3, A4 and B4, A5 and B5, and finally, A6 and B6. Only the first pair, A1 and B1, and the last pair, A6 and B6, are shown. These two pairs connect to input terminals 1 and 6, respectively, of gate 180. The remaining four pairs of gates connect to input terminals 2, 3, 4, and 5 of gate 180. Gates A1, A2, A3, A4, A5 and A6 are input gates or simply inverters (because they have only one input terminal each); gates B1, B2, B3, B4, B5 and B6 are indicator drivers which turn on fault lights I1 through I6 to identify defective lead connections in the integrated circuit being tested (chip or unit under test). Signals to the input gates are supplied by the error detectors described in a foregoing portion of this application, namely output terminals 150 of the detector boards. The input terminals of the six input gates, A1 through A6, are identified as D1 through D6, respectively. A positive or high level signal at one of these input terminals indicates an open connection at a particular terminal of the circuit of the chip or unit under test. For the purpose of explanation, it will be assumed that an open circuit has been detected in a terminal of the unit under test and that the output of the associated error detector is connected to input terminal D1. The signal level at terminal D1 is thus high, as is input terminal 181 of input gate A1.

The high level represented by the arrow pointing upward at input terminal 181 of input gate A1 produces a low level at output terminal 182 of gate A1, as indicated by the arrow pointing downward. Because output terminal 182 of gate A1 is connected to input terminal 1 of gate 180, the signal level at input terminal 1 is also low and output terminal 183 of gate 180 is therefore high, as indicated by the arrow pointing upward. Inverter 163 inverts the high level thus produced at its input terminal and delivers a low level at its output terminal as indicated by the arrow pointing downward.

If all of the input terminals D7 through D12 of input stage 158 are low (indicating no faults at the corresponding terminals of the unit under test), all of the six input terminals of gate 184 will be high and output terminal 185 of gate 184 will be low as indicated. Similarly, if all of the input terminals of input stages 159 and 160 are low, their output terminals 186 and 187, respectively, will also be low as indicated. By the same line of reasoning, the signal levels at input and outut terminals of gate 164 may be determined as indicated by the arrows shown adjacent the output terminals of this gate.

Output stage 161 includes nine three-input NAND gates C1 through C9, nine output gates or inverters E1 through E9, and nine flip-flops FF1 through FF9. Nine additional sets of the same three parts are repeated in identical output stage 162. The total of 18 sets correspond to the 18 test positions, each of which may hold a chip or test unit. The function of the 18 sets is to light a visual indicator corresponding to the particular chip or unit under test in which an open lead connection has been detected.

Before proceeding with the description of operation for typical output stage 161, it will be instructive first to describe the operation of the flip-flop. A flip-flop is a logic circuit having the capability of storing information such as a logic "one" or a logic "zero" as represented electrically by a high or low potential at its output. It is a bi-stable device, i.e., if it is set to a logic "zero" it will remain at a logic "zero." The flip-flop has two input terminals, often designated as the "set" and "reset" terminals, or simply R and S as indicated in FIG. 16. For the case of the flip-flop representations shown in FIG. 16 and more specifically for the case of FF1, a low level at output terminal 188 is set by a low level at input terminal R.

Prior to each test cycle it is necessary to reset all of the flip-flops, FF1 through FF18, in output stages 161 and 162. This is accomplished by momentarily grounding reset terminal 189, thereby momentarily applying low signal levels at the reset terminals R of all the flip-flops. This operation resets all flip-flops to a high output level, as indicated by the arrows adjacent the output terminals of flip-flops FF1 through FF9. By virtue of the inversion produced by output gates E1 through E9, outputs DS1 through DS9 are low, as indicated, and no associated fault indicators are energized.

For the purpose of explanation of the operation of output stages 161 and 162, it will be assumed that the circuit of the chip or unit under test at the moment is in test position three. The active test position is identified through the function of the decode network described in another part of this application. The decode network supplies a positive or high level to one of the 18 input terminals, X1 through X18, corresponding to the active chip unit under test, and at the same time supplies low level signals to the other 17 input terminals corresponding to inactive units. On the basis of the above assumption, then, the input signal level at input terminal X3 will be high and all other input terminals of the set of 18 will be low, as indicated by the arrows adjacent the terminals. Each of the nine NAND gates C1 through C9 of output stage 161, with the exception of gate C3, has a low input signal at one input terminal. Signal levels at the output terminals of these gates are therefore high.

The signal level at the output of gate C3 has not yet been determined. One input terminal is held positive (high) by a signal from the decode network. A second input terminal of gate C3 is high by virtue of its connection to the output terminal of gate 167. The third input terminal of gate C3 is connected to the output terminal of gate 177, which is part of the clock driver system.

Operation of the clock driver system is initiated by applying a positive voltage level to the "enable" terminal 190 at the lower left-hand corner of FIG. 16. This positive level at enable terminal 190 produces a low level at the output terminal of gate 175 which is connected to input terminal 191 of monostable multivibrator 179.

Monostable multivibrator 179 is typical of a circuit commonly used in digital computers which has the capability of producing a positive output pulse (in this case at output terminal 192) each time a negative-going signal is applied to its input terminal. The time duration of the positive output pulse is determined by the microfarad value of a capacitor (in this case capacitor 193) externally connected to the multivibrator circuit.

With the appearance of a high signal level at input terminal 191, multivibrator 179 produces a relatively negative output pulse at output terminal 192. Gate 176 now recognizes relatively negative or low level signals at both of its input terminals. One input terminal is negative by virtue of its connection to enable terminal 190, the other by virtue of its connection to multivibrator output terminal 192. The output terminal of gate 176 thus switches to a positive level, where it remains for the duration of the negative output pulse delivered by multivibrator 179. This momentarily high level appears as a positive pulse, as indicated at the output terminal of gate 176. This positive pulse is inverted by gate 177, which then applies through its output terminal a negative pulse to the line connected to one input terminal each of gates C1 through C9 including the gate of primary interest, C3. When the negative output pulse of gate 177 becomes positive, all three inputs of gate C3 are thus seen to be high throughout the duration of the remainder of the monostable multivibrator pulse. The output of gate C3 thus switches to a low level during this same period, producing the negative pulse shown at its output terminal, which connects directly to the set terminal S of FF3. The negative pulse at the set terminal of FF3 sets a low output at the output terminal, as indicated by the circled arrow. By virtue of the bistable characteristic of the flip-flop, this low output level will be sustained even after the termination of the negative input pulse at its set terminal, S. The low output level is then inverted by inverter E3 which delivers a positive level to output terminal DS3, as denoted by the circled arrow, to energize a fault indicator. This indicates that a defective lead termination has been detected in a test unit located in test position 3.

Additional information relative to the particular terminal number of the defective unit in which the defective termination has been detected is provided by gates B1 through B6 in input stage 157 and by six identical gates in each of the other three input stages, 158 through 160.

In the foregoing description of the operation of input stage 157 it was assumed that a fault had been detected at the terminal being monitored by an error detector whose output is connected to input terminal D1 of input stage 157. The fault signal is a high level, as indicated at the input terminal 181 of gate A1. The low level thus produced at output terminal 182 of gate A1 is connected directly to one input of NAND gate B1. Gate B1 delivers by inversion a high output at terminal $I_1$ to energize an indicator which identifies the particular lead termination which has been found defective in the unit under test.

When enable terminal 190 is returned to a low level (or ground), all terminals, $I_1$ through $I_{24}$, of input stages 157 through 160 switch to a high level. All of the 24 indicators are thus energized. This is a lamp test cycle employed to permit detection and replacement of defective lamps.

Upon completion of a complete thermal cycle for a particular batch of chips or units under test, a reset cycle is initiated to reset all flip-flops. A new batch of chips or units is inserted in test board 27 and another thermal test cycle begins.

OPERATION

The preceding paragraphs have described the functions and operation of the receivers, the detector boards, and the error latch circuits. In the particular embodiment of the invention herein described, there are 18 test positions for testing 18 integrated circuit chips 28, each chip having as many as 24 terminals. There are 18 receivers 48 and 18 error latches 60 or circuits corresponding to the 18 circuits under test. There are 24 detector boards 65, and each receiver 48 has 24 channels corresponding to the 24 pins on each chip under test.

For purposes of explanation, it will be assumed that the input line of channel No. 1 of each receiver 48 is connected to pin No. 1 of the corresponding circuit on the chip under test. There are 24 separate receiver output buses 63 corresponding to the 24 terminals of the chips under test. The output line of channel No. 1 of each and every receiver 48 is connected to the No. 1 output bus 63. The input terminal of the No. 1 detector board 65a is connected to the No. 1 receiver output bus 63.

In the operation of the system, the 18 chips under test are selected one at a time in sequence for interrogation regarding the nature of the 24 pin connections. Sequential selection of each circuit is accomplished by enabling the appropriate receiver, which effects electrical connections between each of the 24 pins of the selected test circuit and the corresponding 24 detector circuits. At the same time, the circuits of the error latch 60 corresponding to the circuit under test are enabled. Thus, for example, at test interval No. 1, the No. 1 receiver 48 and the No. 1 error latch 60 are enabled. The 24 pins of the first test chip 28 are thereby connected to the input terminals of the 24 channels of the enabled receiver 48 and the 24 receiver output buses (A through X). If there is a fault (open lead) at pin 3, for example, of chip No. 1 under test, this fault will be detected by the third circuit of detector board 65a at this time and the output signal of the third circuit of detector board 65a will set error latch No. 1.

The sequential selection of the test circuits as described above is accomplished by the counter and decode logic which is shown as block 57 of the block diagram shown as FIG. 11. Operation of the counter and decode logic will now be described in greater detail.

Automatic operation of the system is initiated by pressing the "oper-auto" mode button 200 and "start" button 201 on the display panel 22. Corresponding enabling signals are thus dispatched from the panel control logic block 67 to the oscillator 202 of the counter and decode logic block 57 shown in more detail in FIG. 17. The oscillator now becomes operational, delivering a series of pulses which are appropriately thirty milliseconds apart. The period of time between these pulses corresponds to the test period for one test circuit on the chip in the sequential test described in the foregoing paragraph. The time period covered by 18 of these pulses corresponds to the time involved in testing 18 test circuits, one per chip and one at a time in sequence. Thus, during the period of time between pulse No. 1 and pulse No. 2, circuit No. 1 on chip No. 1 is tested. During the period of time between pulse No. 2 and pulse No. 3, circuit No. 1 on chip No. 2 is tested, etc. After circuit No. 1 on chip No. 18 is tested following pulse No. 18, the complete 18-step cycle is repeated for the remaining circuits on each of the chips. It will be appreciated that, with a 30 millisecond test time, 18 chips each having 24 different circuits to be tested may be completely tested in approximately thirteen seconds. Given a 2-minute test cycle, during which the chips are subjected to a thermal cycle from 25°C. to 100°C., all circuits on the 18 chips may be tested at least nine times, thereby substantially ensuring that each circuit will be tested a sufficient number of times relative to the thermal cycle to detect any circuit discontinuity.

The output pulses of oscillator 202 are delivered to counter 203 of the counter and decode logic 57. Counter 203 is comprised of two integrated circuit "decode counters," commonly employed in data processing equipment. A "decode counter" has four binary outputs, each capable of being set to a binary one or a binary zero. The combination of the ones and zeroes at the four outputs represents in binary code one of the decimal digits zero through nine. Typical of such counters is Texas Instrument Type SN7490, which is the particular counter employed for the two decode counters included in counter 203. It is the function of these decode counters to produce sequentially at the four output terminals the binary code digits zero through nine in response to a series of input pulses, the output stepping to the next digit at the occurrence of each successive input pulse. The two "decode counters" included in counter 203 are interconnected by means of NAND gates in a manner which produces sequentially the binary codes for a decimal count from one through 18. The binary coded outputs are delivered to decode driver 204 and decoder 205.

Decoder 205 is a four-line to 10-line decoder mounted on an integrated circuit chip. This type of circuit is commonly used in data processing equipment. It has the capability of reading the binary code for decimal digits as it appears at its four input terminals. It then delivers an output signal to one of the 10 output lines. Thus, for example, if the binary coded input is 0011 corresponding to decimal 3, an output signal (in this case a zero) is delivered to output line 3. All other output lines at this time will be high ("ones").

One such 10-line decoder along with a battery of NAND gates is connected to provide 18 output lines C1 through C18. This combination of gates along with the 10-line decoder comprises decoder 205. The decoder thus accepts the binary-coded output signals of counter 203 which counts sequentially from one through 18 (and repeating). The decoder responds by sequentially producing output signals at its output terminals with an output appearing at C1 following the first oscillator pulse, an output appearing at C2 following the second oscillator pulse, etc. These output signals are coupled to the 18 receivers 48 and the 18 error latches 60 for the sequential enabling of these circuits as described earlier.

The output signals of counter 203 are also connected to the decode driver 204. Decode driver 204 is an integrated circuit specifically designed to operate a digital read-out device. The read-out device is a contrivance having three horizontal and four vertical lines which can be selectively illuminated to approximate the form of the decimal digits zero through nine. The decode driver responds to binary-coded signals at its four input lines as received from counter 203 and causes the appropriate line segments in the read-out device to be illuminated. Thus, for example, on count No. 3 when the chip under test is test chip No. 3, the data on the four output lines of the "units" counter will be 0011. This data is transmitted to the decode driver 204, which lights appropriate segments in the read-out device to form the numeral 3.

When the equipment is in the auto (automatic) mode the counter 203, the decode driver 204, and the read-out device are stepping so rapidly from one count to the next that the instantaneous readings of the read-out device cannot be visually identified. In the manual mode, however, the oscillator 202 is not operating. In place of the oscillator pulses, a single pulse is introduced manually each time a button is depressed. In this way, the counter 203, the decode driver 204 and the read-out device are stepped one position at a time as each individual device is tested. For this mode of operation the read-out device is useful in displaying at each interval a numerical identification of the chip under test.

Figure 17:
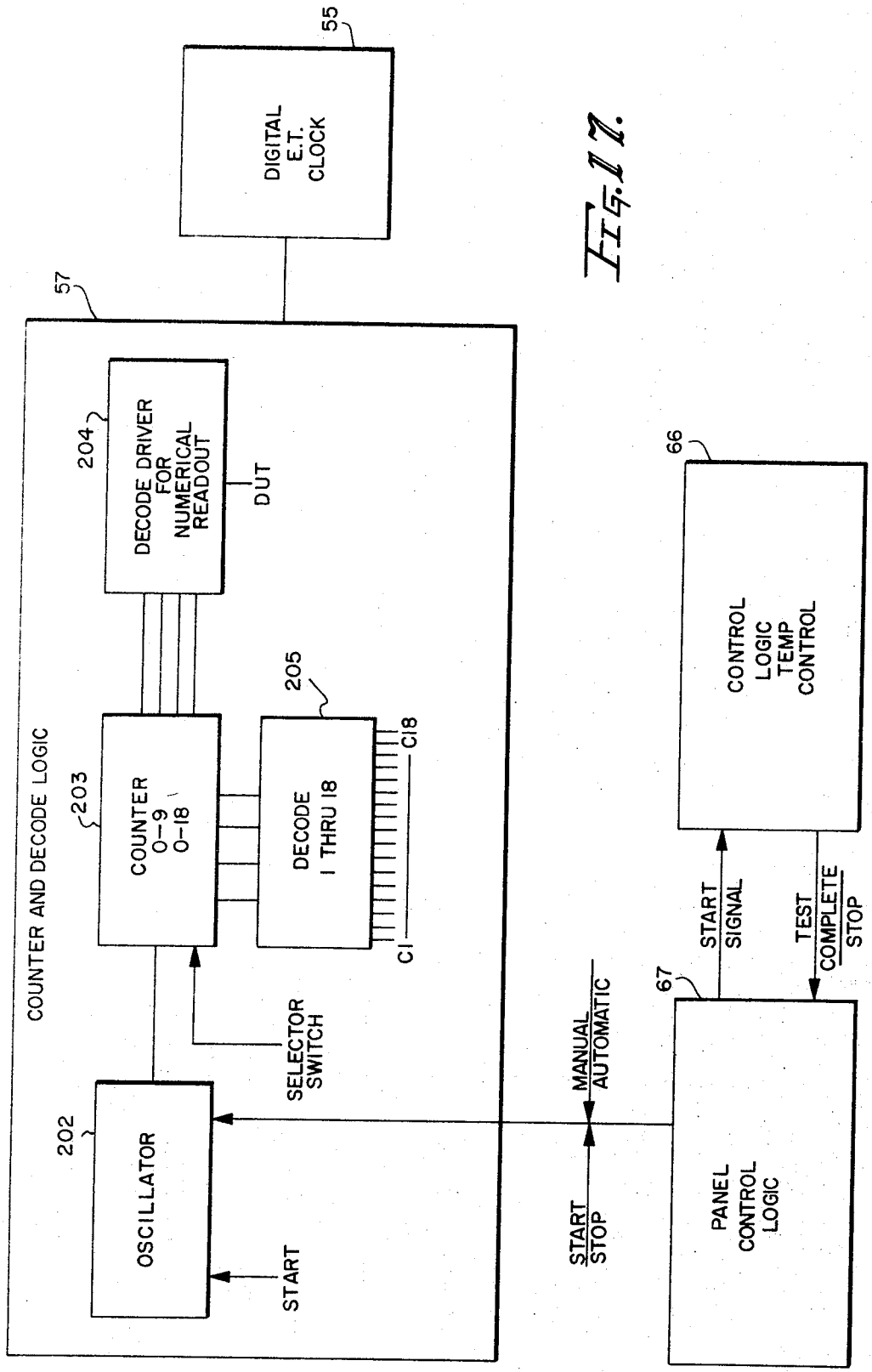
FIG. 17 is a more detailed block diagram of some of the control blocks shown in FIG. 11.

Digital E. T. clock 55 shown in FIGS. 11 and 17 is an "elapsed time" clock comprised of integrated circuits and read-out devices. The digital E. T. clock is enabled and therefore running while tests are in progress.

More specifically, the clock is comprised of an oscillator, decode counters, decode drivers and read-out devices. The oscillator of the clock runs at a fixed rate so that the total number of output pulses produced by the oscillator from the start of the test is a measure of elapsed time during the course of the test. The decode counters monitor the output of the oscillator and supply to the decode drivers a running count of the output pulses. The instantaneous value of this count is displayed by the read-out devices as controlled by the decode drivers. The instantaneous reading of the read-out devices is thus an indication of total elapsed time during the test cycle.

The start signals as well as the auto and manual control signals to which reference was made in the preceding discussion originate in the panel control logic block 67 of FIGS. 11 and 17. The start signal from this block is also transmitted to the control logic temperature control block 66 of FIGS. 11 and 17. The function of block 66 is to produce the temperature cycle for the devices under test. This is accomplished by controlling the flow of current through the heating and cooling elements while monitoring the temperature of the integrated circuits as they are being tested. Thus, for example, the direction of current is first controlled as appropriate to raise the temperature of the device being tested. A temperature sensor (not shown) monitors the device temperature and produces an output signal when the maximum test temperature is reached. At this instant control block 66 causes the direction of current in the heating and cooling device to be reversed and thereby to produce a cooling effect which causes the temperature of the device being tested to fall toward the minimum test temperature. A temperature sensor (not shown) produces a signal when the minimum test temperature is reached and a test complete signal is produced in block 66 which is transmitted to the panel control logic block 67 to stop the test cycle. Simultaneously with the occurrence of this test complete signal, a stop signal is transmitted to counter decode logic block 57 and to the digital E. T. clock 55 to stop the operation of these circuits.

While the principles of the invention have now been made clear in an illustrative embodiment, there will be many obvious modifications of the structure, proportions, materials and components without departing from these principles. The appended claims are intended to cover any such modifications.

What is claimed is:

1. A method of inspecting a plurality of electronic devices, each device containing a like number of circuits, each of said circuits being electrically connected between at least two conducting means, said conducting means being located on said devices and being arranged for electrically connecting said devices to external electrical circuit means, said method comprising the steps of:

a. mounting said devices on a support means,
   b. testing a first one of said circuits in each of said plurality of devices for electrical conduction continuity in said first circuit by sequentially applying two different electrical potentials between two conducting means to which said one circuit is connected, said electrical potentials being of such magnitudes that the application of one electrical potential causes current to flow in one direction through said circuit and the application of the other electrical potential causes current to flow in the opposite direction through said circuit, and detecting whether the electrical conduction continuity of said one circuit is broken or now broken during the application of said electrical potentials to said conducting means,
   c. providing an indication of a lack of electrical conduction continuity for each device in which the electrical conduction continuity between the conducting means connected to said first circuit is determined to be broken,
   d. testing a second one of said circuits in each of said plurality of devices for electrical conduction continuity in said second circuit between two conducting means to which it is connected in the manner provided in step (b),
   e. providing an indication of a lack of electrical conduction continuity for each device in which the electrical conduction continuity between the conducting means connected to said second circuit is determined to be broken,
   f. testing in turn each of the remaining circuits of said devices, providing indications of any lack of electrical conduction continuity for those devices in which the electrical conduction continuity between the conducting means is determined to be broken,
   g. subjecting said devices to a temperature cycle of approximately one to five minutes time duration and approximately 75° to 100°C. temperature range as steps (b) through (f) are performed, said temperature cycle being of sufficient time duration to permit each circuit of each said device to be tested at least once during said temperature cycle.

2. A method of inspecting a plurality of plastic encapsulated integrated circuit devices, wherein each device contains a like number of electronic circuits and each of said circuits is electrically connected between a different pair of leads of said device, said method comprising the steps of:

a. detachably mounting said devices on a support means,
   b. sequentially applying two different electrical potentials across the pair of leads associated with a first one of said circuits in a first one of said plurality of devices, said electrical potentials being of such magnitudes that the application of one electrical potential causes current to flow in one direction through said circuit and the application of the other electrical potential causes current to flow in the opposite direction through said circuit, c. detecting any lack of electrical conduction continuity between said pair of leads through said first circuit of said first device during the application of said electrical potentials, d. activating indicators associated respectively with said first circuit and said first device in the event that a lack of electrical conduction continuity is detected, e. sequentially applying the same two electrical potentials across the pair of leads associated with a first one of said circuits in a second one of said plurality of devices, said first circuit in said first and second devices occupying the same relative position within said devices, f. detecting any lack of electrical conduction continuity between said pair of leads through said first circuit of said second device during the application of said electrical potentials, g. activating indicators associated respectively with said first circuit and said second device in the event that a lack of electrical conduction continuity is detected, h. sequentially applying the same two electrical potentials in turn across the pair of leads associated with said first circuit in each of the remaining devices, said first circuit occupying the same relative position in said remaining devices as in said first and second devices, detecting any lack of electrical conduction continuity between said pairs of leads through said remaining devices during the application of said electrical potentials, and activating indicators associated respectively with said first circuit and any of said remaining devices in the event that a lack of electrical conduction continuity is detected in any of said remaining devices, i. sequentially applying the same two electrical potentials across the pair of leads associated with a second one of said circuits in said first device, j. detecting any lack of electrical conduction continuity between said pair of leads through said second circuit of said first device during the application of said electrical potentials, k. activating indicators associated respectively with said second circuit and said first device in the event that a lack of electrical conduction continuity is detected, l. sequentially applying the same two electrical potentials across the pair of leads associated with a second one of said circuits in a second one of said plurality of devices, said second circuit in said first and second devices occupying the same relative position within said devices, m. detecting any lack of electrical conduction continuity between said pair of leads through said second circuit of said second device during the application of said electrical potentials, n. activating indicators associated respectively with said second circuit and said second device in the event that a lack of electrical conduction continuity is detected, o. sequentially applying the same two electrical potentials in turn across the pair of leads associated with said second circuit in each of the remaining devices, said second circuit occupying the same relative position in said remaining devices as in said first and second devices, detecting any lack of electrical conduction continuity between said pairs of leads through said remaining devices during the application of said electrical potentials, and activating indicators associated respectively with said second circuit and any of said remaining devices in the event that a lack of electrical conduction continuity is detected in any of said remaining devices, p. sequentially applying the same two potentials in turn across the pair of leads associated with each of said remaining circuits in said plurality of devices, detecting any lack of electrical conduction continuity between said pair of leads associated with any of said circuits in said devices during the application of said electrical potentials, and activating indicators associated respectively with the particular circuit and device in the event that a lack of electrical conduction continuity is detected, q. subjecting said devices to a temperature cycle of approximately 1 to 5 minutes time duration and approximately 75° to 100°C. temperature range as steps (b) through (p) are performed, said temperature cycle being of sufficient time duration to permit the pair of leads associated with each circuit of each said device to be inspected at least once during said temperature cycle.

3. The method according to claim 2, in which the pair of leads associated with each circuit of said devices is inspected a plurality of times during said temperature cycle.

4. Apparatus for inspecting a plurality of electronic devices, wherein each device contains a like number of circuits and each of said circuits is electrically connected between at least two conducting means, and wherein said conducting means on each of said devices are arranged for electrically connecting said device to external electrical circuit means, said apparatus comprising:

a. support means upon which said plurality of devices may be detachably mounted, b. selecting means to select for testing one of said circuits in each of said plurality of devices, c. testing means, responsive to a selection operation by said selecting means, for testing in each of said plurality of devices the electrical conduction continuity in said selected circuit between two conducting means to which it is connected by sequentially applying two different electrical potentials between said two conducting means, said electrical potentials being of such magnitudes that the application of one electrical potential causes current to flow in one direction through said circuit and the application of the other electrical potential causes current to flow in the opposite direction through said circuit, and detecting whether the electrical conduction continuity of said circuit is broken or not broken during the application of said electrical potentials to said conducting means, d. indicating means, responsive to said testing means, for providing an indication of a lack of electrical conduction continuity for each device in which the electrical conduction continuity between the conducting means connected to said circuit being tested is determined to be broken, e. sequencing means, connected to said selecting means and responsive to said testing means, for causing said selecting means to select additional ones of said circuits in each of said plurality of devices for testing by said testing means, said sequencing means being actuated to cause said selecting means to select an additional circuit in each of said devices in response to the conclusion of a testing operation on each of said devices by said testing means, said sequencing means being operative to cause said selecting means to continue to select said additional ones of said circuits until all of said circuits of said devices have been tested, f. means for subjecting said devices to a temperature cycle of approximately 1 to 5 minutes time duration and approximately 75° to 100°C. temperature range, said temperature cycle being of sufficient time duration to permit each circuit of each said device to be tested at least once during said temperature cycle.

5. Apparatus for inspecting a plurality of plastic encapsulated integrated circuit devices while thermally cycling said devices through a predetermined temperature range, wherein each device contains a like number of electronic circuits and each of said circuits is electrically connected between a different pair of leads of said device, said apparatus comprising:

a. support means upon which said plurality of devices may be detachably mounted, b. circuit selecting means to select for testing one of said circuits in each of said plurality of devices, said selected circuits being located in the same relative position on each of said devices, c. means for sequentially applying two different voltage potentials across the pair of leads in each device associated with a circuit which has been selected for testing by said circuit selecting means, said electrical potentials being of such magnitudes that the application of one electrical potential causes current to flow in one direction through said circuit and the application of the other electrical potential causes current to flow in the opposite direction through said circuit, d. detecting means for detecting a lack of electrical conduction continuity during the application of said electrical potentials between any of the pairs of leads associated with a circuit which has been selected for testing by said circuit selecting means, and for providing an output signal for each device in which there is a lack of electrical conduction continuity, e. indicating means, comprising a first set of indicators associated with respective ones of said circuits and a second set of indicators associated with respective ones of said devices, f. indicator latching means, connected to each of said second set of indicators, for maintaining any of said second set of indicators in an actuated condition once it has been actuated, g. sequencing means, connected between said detecting means and said indicating means, for connecting an output signal of said detecting means, if present, to the indicator of said first set of indicators which corresponds to a circuit selected for testing by said circuit selecting means, thereby actuating said indicator, and for sequentially connecting in turn output signals of said detecting means, corresponding to devices in which there is a lack of electrical conduction continuity for the particular circuit selected for testing, to the indicators of said second set of indicators associated with the respective defective devices, thereby actuating said indicators, h. control means, responsive to said sequencing means, for causing said circuit selecting means to select for testing in turn each of said circuits in said plurality of devices, and i. means for subjecting said devices to a temperature cycle of approximately 1 to 5 minutes time duration and approximately 75° to 100°C. temperature range, said temperature cycle being of sufficient time duration to permit said control means to cause each circuit of each said device to be selected for testing at least once during said temperature cycle.

6. The apparatus recited in claim 5, in which said control means causes each circuit of each said device to be selected for testing a plurality of times during said temperature cycle.

7. The apparatus recited in claim 5, in which the temperature subjecting means comprises means for alternatively heating and cooling said devices.

8. The apparatus recited in claim 7, in which the means for alternatively heating and cooling said devices comprises a thermoelectric heat pump.

* * * * *